(12) United States Patent
Chang et al.

(10) Patent No.: US 12,730,526 B2
(45) Date of Patent: Sep. 8, 2026

(54) KNOB DEVICE

(71) Applicant: Novatek Microelectronics Corp., Hsinchu (TW)

(72) Inventors: Yao Chung Chang, Taichung City (TW); Chih-Chang Lai, Taichung City (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 19/086,079

(22) Filed: Mar. 20, 2025

(65) Prior Publication Data

US 2026/0050336 A1 Feb. 19, 2026

Related U.S. Application Data

(60) Provisional application No. 63/682,798, filed on Aug. 14, 2024.

(51) Int. Cl.

*G06F 3/0362* (2013.01)
*G06F 3/039* (2013.01)
*G06F 3/044* (2006.01)

(52) U.S. Cl.

CPC .......... *G06F 3/0362* (2013.01); *G06F 3/0393* (2019.05); *G06F 3/044* (2013.01)

(58) Field of Classification Search

CPC ....... G06F 3/0362; G06F 3/0393; G06F 3/044
See application file for complete search history.

(56) References Cited

U.S. PATENT DOCUMENTS

| | | | | |
|---|---|---|---|---|
| 8,912,457 | B2 * | 12/2014 | Tseng | G05G 1/10 200/336 |
| 10,664,110 | B2 * | 5/2020 | Yin | G06F 3/0393 |
| 10,921,913 | B1 * | 2/2021 | Fong | G06F 3/0393 |
| 11,175,775 | B2 * | 11/2021 | Ikegami | G06F 3/044 |
| 11,983,338 | B1 * | 5/2024 | Fong | G06F 3/0441 |
| 12,260,032 | B1 * | 3/2025 | Liu | G06F 3/0362 |
| 12,261,001 | B2 * | 3/2025 | Kuzo | H01H 19/14 |
| 2018/0024649 | A1 * | 1/2018 | Uno | G06F 3/0338 345/174 |
| 2018/0157411 | A1 * | 6/2018 | Kim | G06V 40/1318 |
| 2018/0275769 | A1 * | 9/2018 | Ikeda | G06F 3/039 |
| 2019/0073526 | A1 * | 3/2019 | Kirita | H04M 1/72403 |
| 2019/0391671 | A1 * | 12/2019 | Pfau | G06F 3/0362 |
| 2020/0073487 | A1 * | 3/2020 | Ballan | G06F 3/0362 |

(Continued)

FOREIGN PATENT DOCUMENTS

| | | |
|---|---|---|
| CN | 108509093 | 9/2018 |
| CN | 109564487 | 4/2019 |
| CN | 109923503 | 6/2019 |

OTHER PUBLICATIONS

"Office Action of Taiwan Counterpart Application", issued on Jan. 28, 2026, p. 1-p. 6.

*Primary Examiner* — Vinh T Lam
(74) *Attorney, Agent, or Firm* — JCIPRNET

(57) ABSTRACT

A knob device including a first layer and a second layer is provided. The first layer is disposed on a touch panel. The first layer includes a plurality of first conductive pads with interconnectors. The second layer is disposed on the first layer. The second layer includes a first conductive part. The first conductive part and the first conductive pads with the interconnects are connectable to provide a plurality of press states in response to a press operation.

16 Claims, 26 Drawing Sheets

(56) References Cited

U.S. PATENT DOCUMENTS

| | | | | |
|---|---|---|---|---|
| 2020/0117288 | A1* | 4/2020 | Lopez | B60K 35/80 |
| 2021/0173542 | A1* | 6/2021 | Hinson | G06F 3/0488 |
| 2021/0200337 | A1* | 7/2021 | Takaoka | G06F 3/0393 |
| 2021/0240305 | A1* | 8/2021 | Takada | G05G 1/02 |
| 2022/0019295 | A1* | 1/2022 | Su | G06F 3/0362 |
| 2022/0019297 | A1* | 1/2022 | Su | G06F 3/041 |
| 2023/0393667 | A1* | 12/2023 | Park | H01H 13/06 |
| 2024/0062972 | A1* | 2/2024 | Hinson | H01H 19/14 |
| 2024/0310936 | A1* | 9/2024 | Chang | G06F 3/04166 |
| 2024/0345672 | A1* | 10/2024 | Fujisawa | G06F 3/0393 |
| 2025/0033472 | A1* | 1/2025 | Mathews | G06F 3/0446 |

* cited by examiner

KNOB DEVICE

CROSS-REFERENCE TO RELATED APPLICATION

This application claims the priority benefit of U.S. provisional application Ser. No. 63/682,798, filed on Aug. 14, 2024. The entirety of the above-mentioned patent application is hereby incorporated by reference herein and made a part of this specification.

BACKGROUND

Technical Field

This invention relates to a touch apparatus, and in particular to a touch apparatus with a knob device.

Description of Related Art

Nowadays, many vehicle center information displays (CIDs) are equipped with touch functions. For example, drivers can touch the CID (touch panel) to adjust the temperature, volume, or other system values. When the drivers adjust the system values in their vehicles, they need to spend more time to pay attention to the touch position of the CID and the related values, which leads to safety concerns.

Conventional in-vehicle systems use mechanical knobs as inputs to adjust in-vehicle functions such as air conditioning and volume control. In an intelligent vehicle system, the touch panel will be integrated with functions such as air conditioning and volume control, allowing the user to control all vehicle functions by touch, which is why the Knob on Touch Display (KOTD) solution has been developed.

SUMMARY

The invention provides a knob device for realizing a physical knob function on a touch panel.

An embodiment of the invention provides a knob device including a first layer and a second layer. The first layer is disposed on a touch panel. The first layer includes a plurality of first conductive pads with interconnectors. The second layer is disposed on the first layer. The second layer includes a first conductive part. The first conductive part and the first conductive pads with the interconnects are connectable to provide a plurality of press states in response to a press operation.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
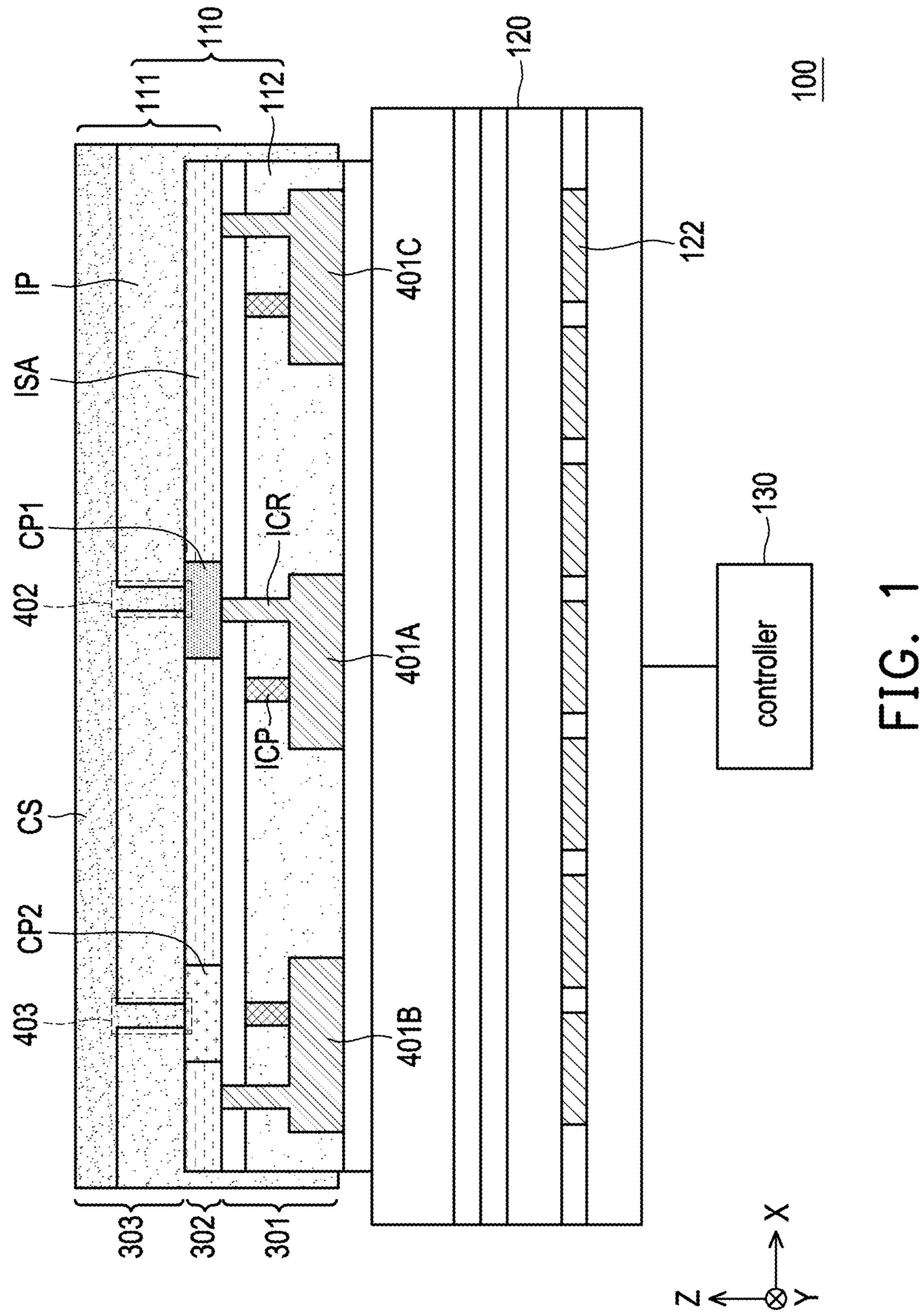
FIG. 1 is a cross-sectional view of a touch apparatus according to an embodiment of the invention.

The word "coupling (or connection)" used throughout the specification of this application (including the claims) can refer to any direct or indirect connection means. For example, if a first device is described as being coupled (or connected) to a second device, it should be interpreted as meaning that the first device can be directly connected to the second device, or that the first device can be indirectly connected to the second device by other devices or some means of connection. The terms "first" and "second", etc. mentioned throughout the full text of the specification of this application (including the claims) are used to name elements or to distinguish different embodiments or scopes, and are not used to limit the upper or lower limit of the number of elements, nor are they used to limit the order of the elements. In addition, wherever possible, elements/components/steps with the same reference numerals are used in the drawings and embodiments to represent the same or similar parts. Elements/components/steps using the same reference numerals or using the same terms in different embodiments can refer to the relevant descriptions of each other.

Figure 2:
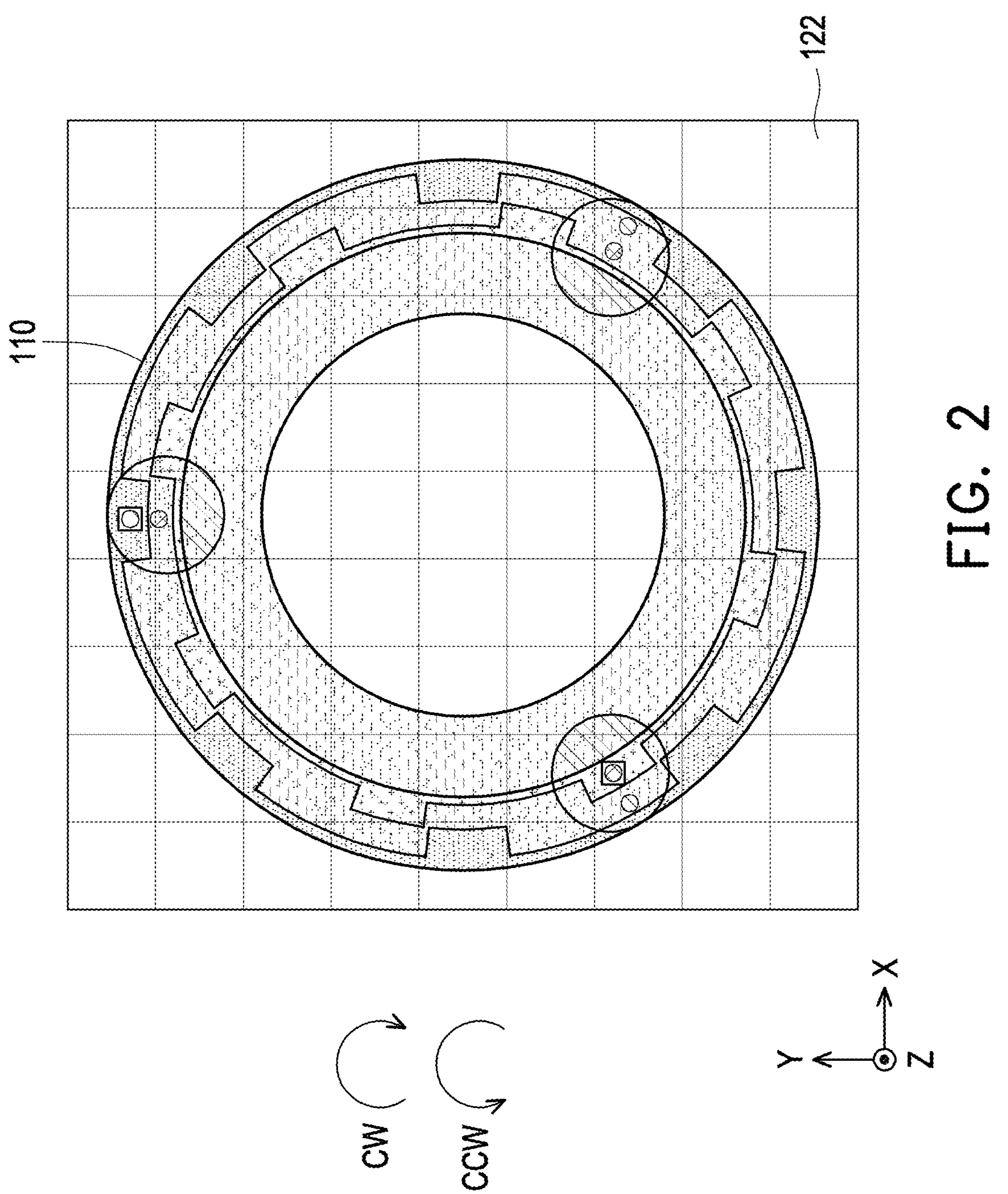
FIG. 2 is a top view of the touch apparatus of FIG. 1 according to an embodiment of the invention.

FIG. 1 is a cross-sectional view of a touch apparatus according to an embodiment of the invention. FIG. 2 is a top view of the touch apparatus of FIG. 1 according to an embodiment of the invention. Referring to FIG. 1 and FIG. 2, the touch apparatus 100 includes a knob device 110, a touch panel 120, and a controller 130. Depending on different designs, in some embodiments, the controller 130 may be implemented as a hardware circuit. In other embodiments, the controller 130 may be implemented in the form of firmware, software (i.e., program), or a combination of the foregoing. In some embodiments, the implementation of the controller 130 may be a combination of hardware, firmware, and software.

In terms of hardware form, the controller 130 may be implemented in a logic circuit on an integrated circuit. For example, relevant functions of the controller 130 may be implemented in one or more controller, microcontroller, microprocessor, application-specific integrated circuit (ASICs), digital signal processor (DSP), field programmable gate array (FPGA), central processing unit (CPU) and/or various logic blocks, modules, and circuits in other processing units. Relevant functions of the controller 130 may be implemented as hardware circuits, such as various logic blocks, modules, and circuits in integrated circuits, using hardware description languages (e.g., Verilog HDL or VHDL) or other suitable programming languages.

In terms of software form and/or firmware form, the relevant functions of the controller 130 may be implemented as programming codes. For example, the controller 130 is implemented using general programming languages (e.g., C, C++, or combination language) or other suitable programming languages. The programming code may be recorded/stored in a "non-transitory machine-readable storage medium". In some embodiments, the non-transitory machine-readable storage medium includes, for example, a semiconductor memory and/or a storage device. An electronic apparatus (e.g., a computer, CPU, controller, microcontroller, or microprocessor) may read and execute the programming code from the non-transitory machine-readable storage medium, thereby realizing relevant functions of the controller 130.

The touch panel 120 has multiple sensors 122. The controller 130 is coupled to the sensors 122. The controller 130 may detect a touch event of the touch panel 120 through the sensors 122. This embodiment does not limit the implementation of the touch panel 120. Depending on the actual design, the touch panel 120 may be a conventional display panel with a touch sensing function or other touch sensing panels.

The knob device 110 is attached to the touch panel 120 to form a knob on touch display. Based on the actuation/control of the controller 130, the touch panel 120 may sense the knob device 110. Thus, a user (e.g., a driver) does not need to be distracted from viewing the touch panel 120 (e.g., a touch screen) when performing in-vehicle controls on the touch panel 120, thereby enhancing driving safety.

In the present embodiment, the knob device 110 has a knob cap 111 and a base 112. The base 112 is fixed and attached to touch panel 120. The knob cap 111 is pivoted on the base 112. Based on twisting by a user, the knob cap 111 may be rotated on a rotation axis of the base 112. The user may twist the knob cap 111 according to a rotation direction CW, or twist the knob cap 111 according to a rotation direction CCW.

Figure 3:
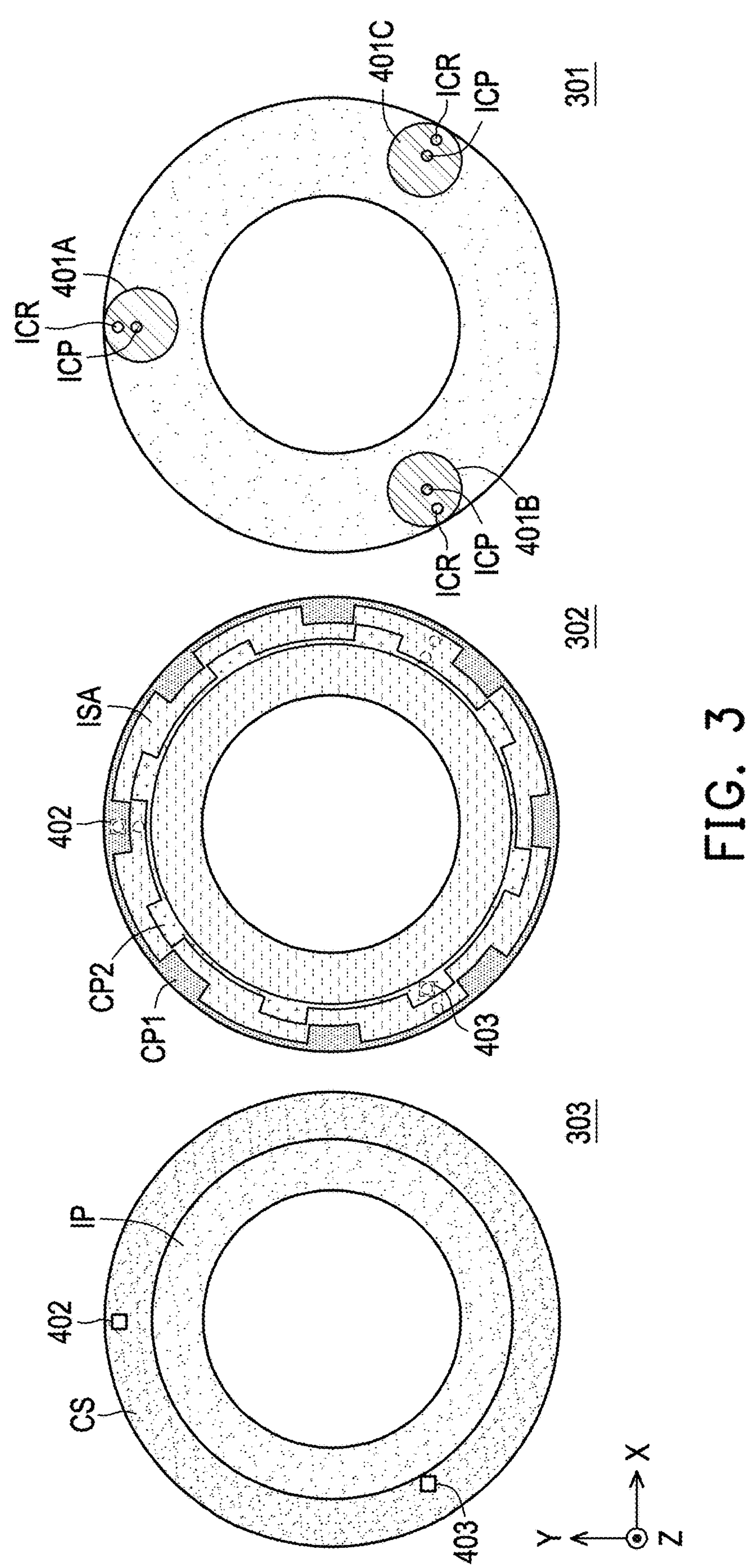
FIG. 3 is a top view of layers of the knob device of FIG. 1 according to an embodiment of the invention.

FIG. 3 is a top view of layers of the knob device of FIG. 1 according to an embodiment of the invention. Referring to FIG. 1 to FIG. 3, the knob device 110 includes a top layer 303, a middle layer 302, and a bottom layer 301. The top layer 303 is disposed on the middle layer 302, and the middle layer 302 is disposed on the bottom layer 301. The knob cap 111 includes the middle layer 302 and the top layer 303. The bottom layer 301 is disposed on the touch panel 120, and serves as the base 112.

The top layer 303 includes a conductive surface CS and an insulating part IP. The conductive surface CS is connected to a first conductive part CP1 and a second conductive part CP2 of the middle layer 302 via conductive pillars 402 and 403, respectively. The insulating part IP is disposed between the conductive surface CS and the middle layer 302. The conductive surface CS is a ring or a solid body covering the entire top of the knob device 110, which may extend to the side area of the knob device 110, depending on the shape of the knob device 110. The top layer 303 rotates according to user's operation.

The middle layer 302 is a rotary wheel, and there are a conductor area and an insulating area ISA. The middle layer 302 includes the first conductive part CP1 and the second conductive part CP2 disposed in the conductor area. The conductor area is divided into the first conductive part CP1 and the second conductive part CP2, both of which are connected to the conductive surface CS. The conductive surface CS connects the first conductive part CP1 and the second conductive part CP2 via the conductive pillars 402 and 403, respectively. The middle layer 302 also rotates according to user's operation. By rotating and/or pressing, the first conductive part CP1 and the second conductive part CP2 are conducted or not with conductive pads 401A, 401B, 401C of the bottom layer 301 via interconnectors.

The bottom layer 301 includes three conductive pads (first conductive pads) 401A, 401B, 401C with interconnectors. The three conductive pads 401A, 401B, 401C each have a first interconnector ICR and a second interconnector ICP, both of which are not equal in height. For example, the first interconnector ICR and the second interconnector ICP of the conductive pad 401A have different heights. The bottom layer 301 is fixed on the touch panel 120, and does not rotate according to user's operation.

The knob rotation operation will be described below.

Figure 4A:
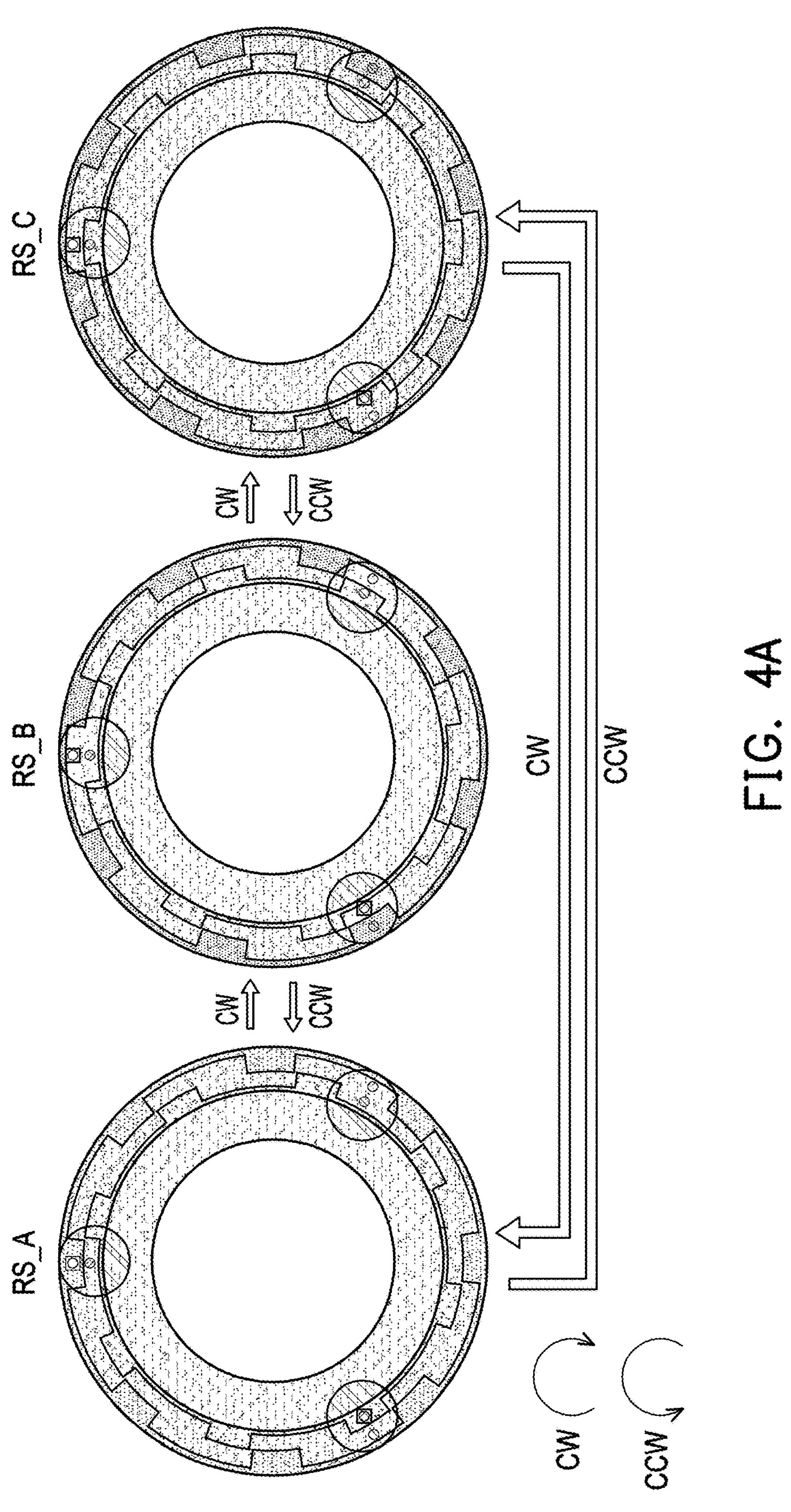
FIG. 4A, FIG. 4B, and FIG. 4C are schematic diagrams illustrating the knob rotation operation of the knob device according to an embodiment of the invention.
Figure 4B:
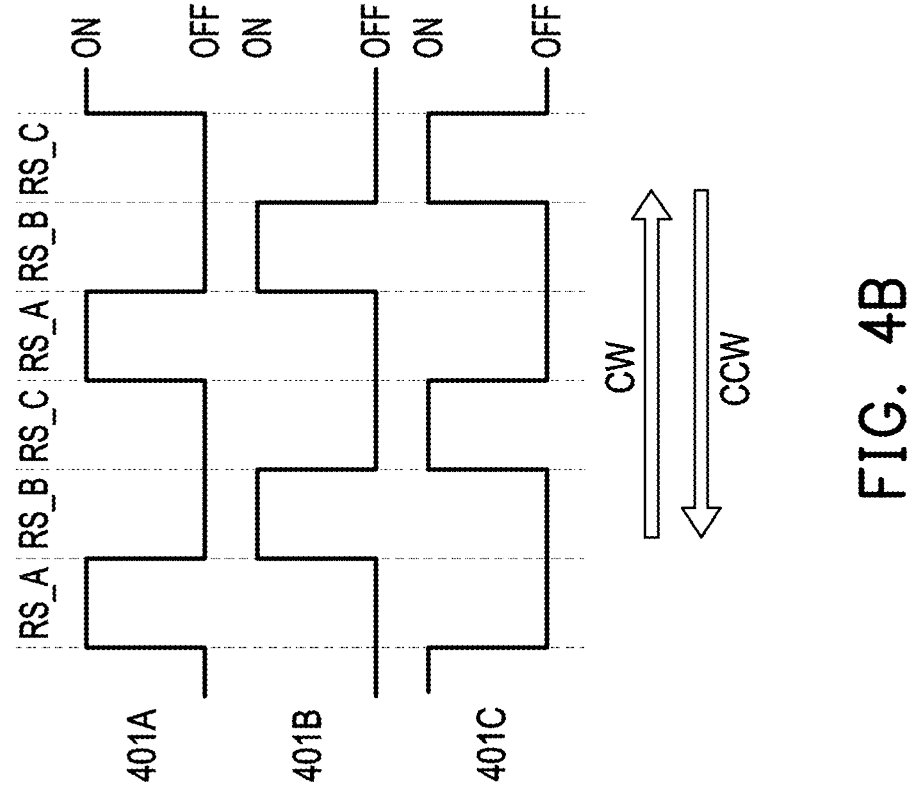
Figure 4C:
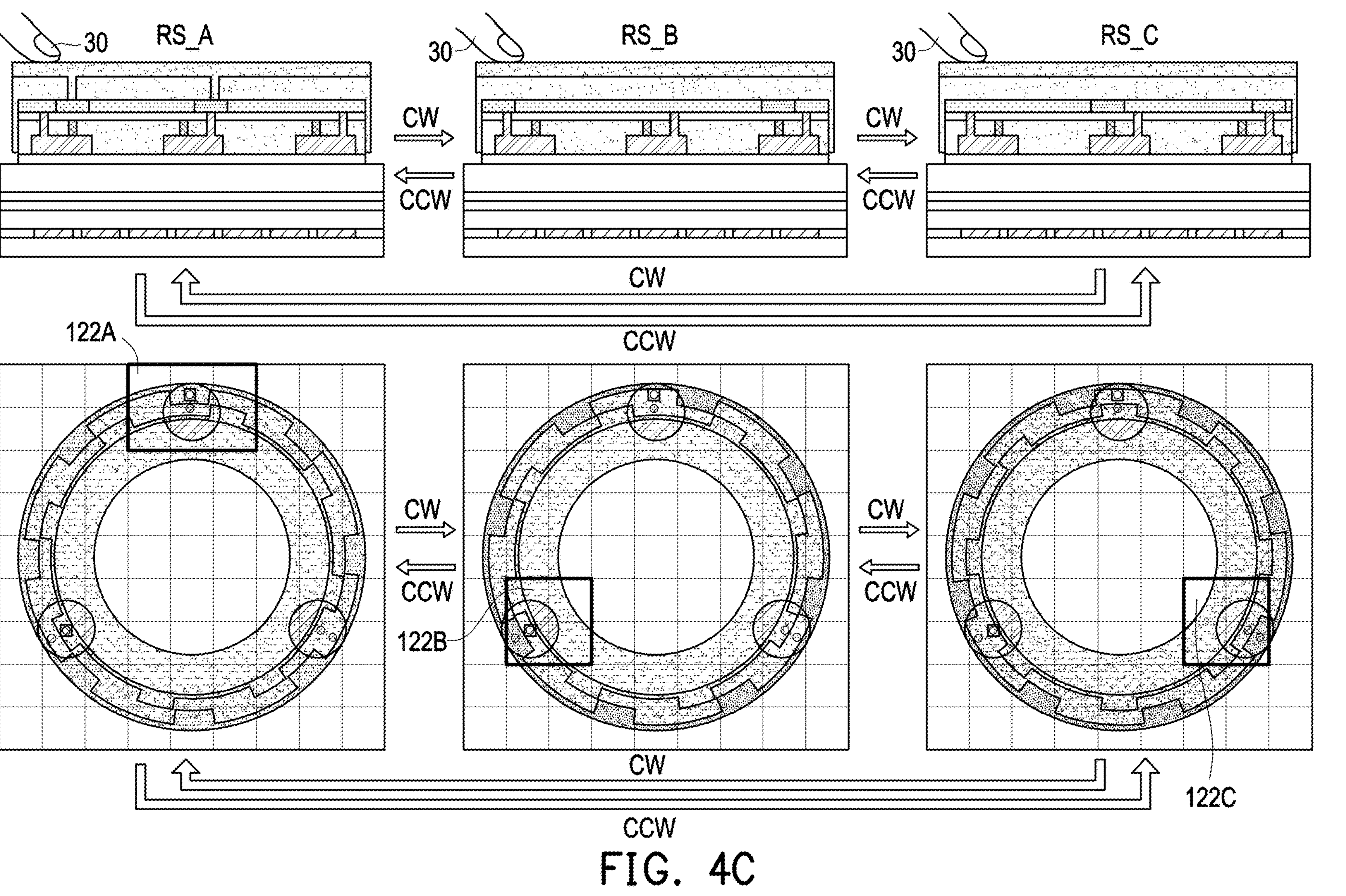

FIG. 4A, FIG. 4B, and FIG. 4C are schematic diagrams illustrating the knob rotation operation of the knob device 110 according to an embodiment of the invention. Referring to FIG. 4A to FIG. 4C, FIG. 4A shows top views of the knob device 110 in different rotation states RS_A, RS_B, RS_C, and FIG. 4C shows cross-sectional views and corresponding top views of the knob device 110 in the different rotation states RS_A, RS_B, RS_C. In addition, the conduction states of the conductive pads 401A, 401B, 401C in the different rotation states RS_A, RS_B, RS_C are shown in FIG. 4B.

With the rotary wheel and interconnectors design, the first conductive part CP1 is controlled to connect to only one of the conductive pads 401A, 401B, 401C during rotation. The rotation states are defined as RS_A, RS_B, RS_C. In the rotation state RS_A, only the conductive pad 401A is connected to the first conductive part CP1 via its interconnector ICR, as shown with "ON" (logic 1) in FIG. 4B. "OFF" (logic 0) indicates that the conductive pads 401B and 401C are not connected to the first conductive part CP1 in the rotation state RS_A. Similarly, in the rotation states RS_B and RS_C, only the conductive pads 401B and 401C are connected to the first conductive part CP1, respectively.

Referring to FIG. 4C, when the user 30 rotates the knob cap 111, the finger touches the conductive surface CS, which extends the finger potential to one of the conductive pads 401A, 401B, 401C through the conductors. The touch sensors, e.g. 122A, 122B or 122C, corresponding to this pad can sense the capacitance change, while the other two pads are not connected, and the touch sensors 122 corresponding to these two pads cannot detect the capacitance change. The controller 130 with the touch algorithm can use this feature to detect the current rotation state and determine the rotation direction.

To be specific, when the user 30 contacts the conductive surface CS, and the conductive surface CS is selectively coupled to the conductive pad 401A, the controller 130 detects that a touch event occurs at the position of the conductive pad 401A of the touch panel 120, but no touch event occurs in the conductive pads 401B and 401C. The touch sensors 122A corresponding to the conductive pad 401A can sense the capacitance change, while the touch sensors 122B and 122C corresponding to the conductive pads 401B and 401C cannot detect the capacitance change. At this time, the controller 130 converts the detection results into a digital code "100"(i.e., state RS_A shown in FIG. 4B). Similarly, when the user 30 contacts the conductive surface CS, and the conductive surface CS is selectively coupled to the conductive pad 401B, the controller 130 converts the detection results into a digital code "010" (i.e., state RS_B shown in FIG. 4B). When the user 30 contacts the conductive surface CS, and the conductive surface CS is selectively coupled to the conductive pad 401C, the controller 130 converts the detection results into a digital code "001" (i.e., state RS_C shown in FIG. 4B).

The controller 130 compares the current code with the previous code to determine whether the knob cap 111 has been rotated, and then determines the rotation direction of the knob cap 111. When the current code and the previous code indicate that the switching sequence is a first sequence (e.g., state RS_A "100"→state RS_B "010"→state RS_C "001"→state RS_A "100"), the controller 130 determines the rotation direction of the knob cap 111 is clockwise. When the current code and the previous code indicate that the switching sequence is a second sequence (e.g., state RS_C "001"→state RS_B "010"→state RS_A "100"→state RS_C "001"), the controller 130 determines that the rotation direction of the knob cap 111 is counterclockwise.

The rotation state switching sequence is a fixed and cyclic sequence, and the clockwise and counter clockwise switching sequences are reversed. The above logic sequence can be adjusted according to the design of interconnectors, conductive pads, rotary wheel, as long as the rotation state switching sequence is fixed and cyclic.

The knob press operation will be described below.

Figure 5A:
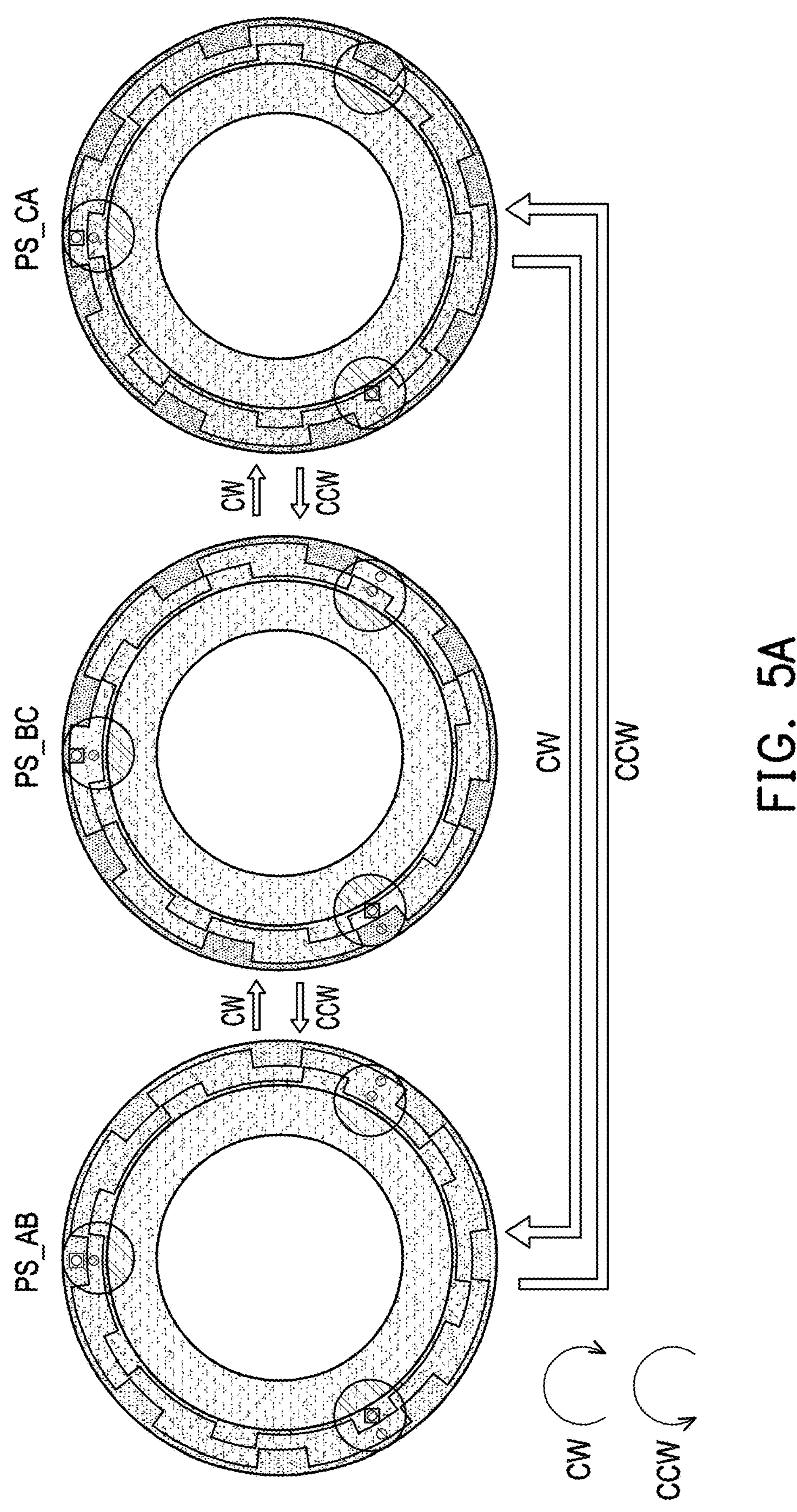
FIG. 5A, FIG. 5B, and FIG. 5C are schematic diagrams illustrating the knob press operation of the knob device according to an embodiment of the invention.
Figure 5B:
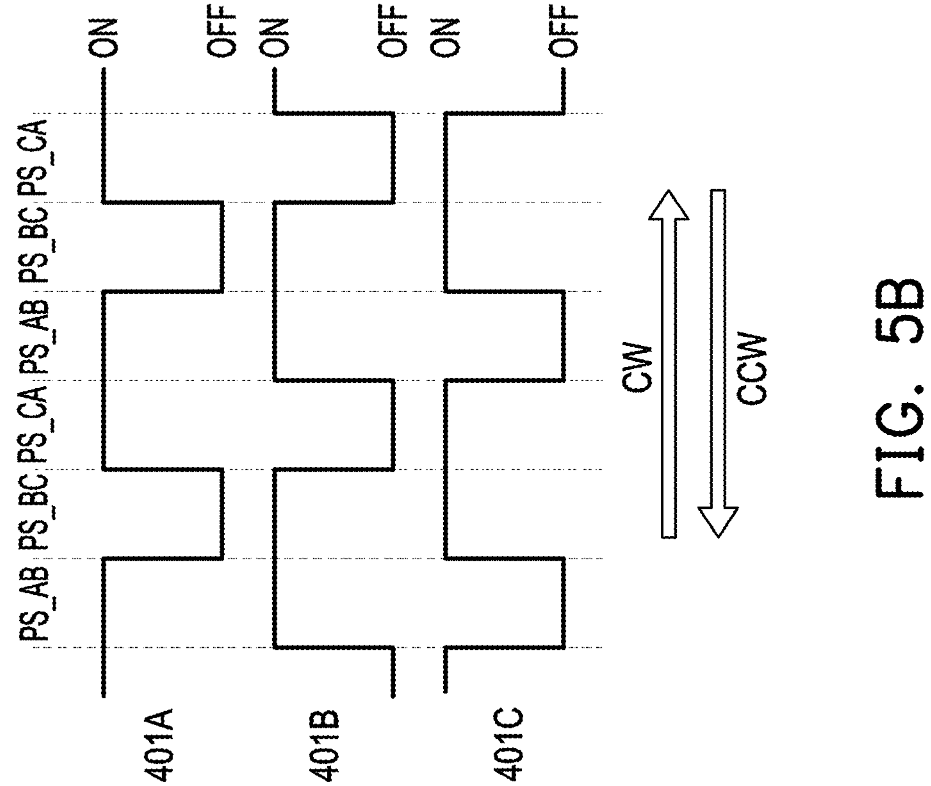
Figure 5C:
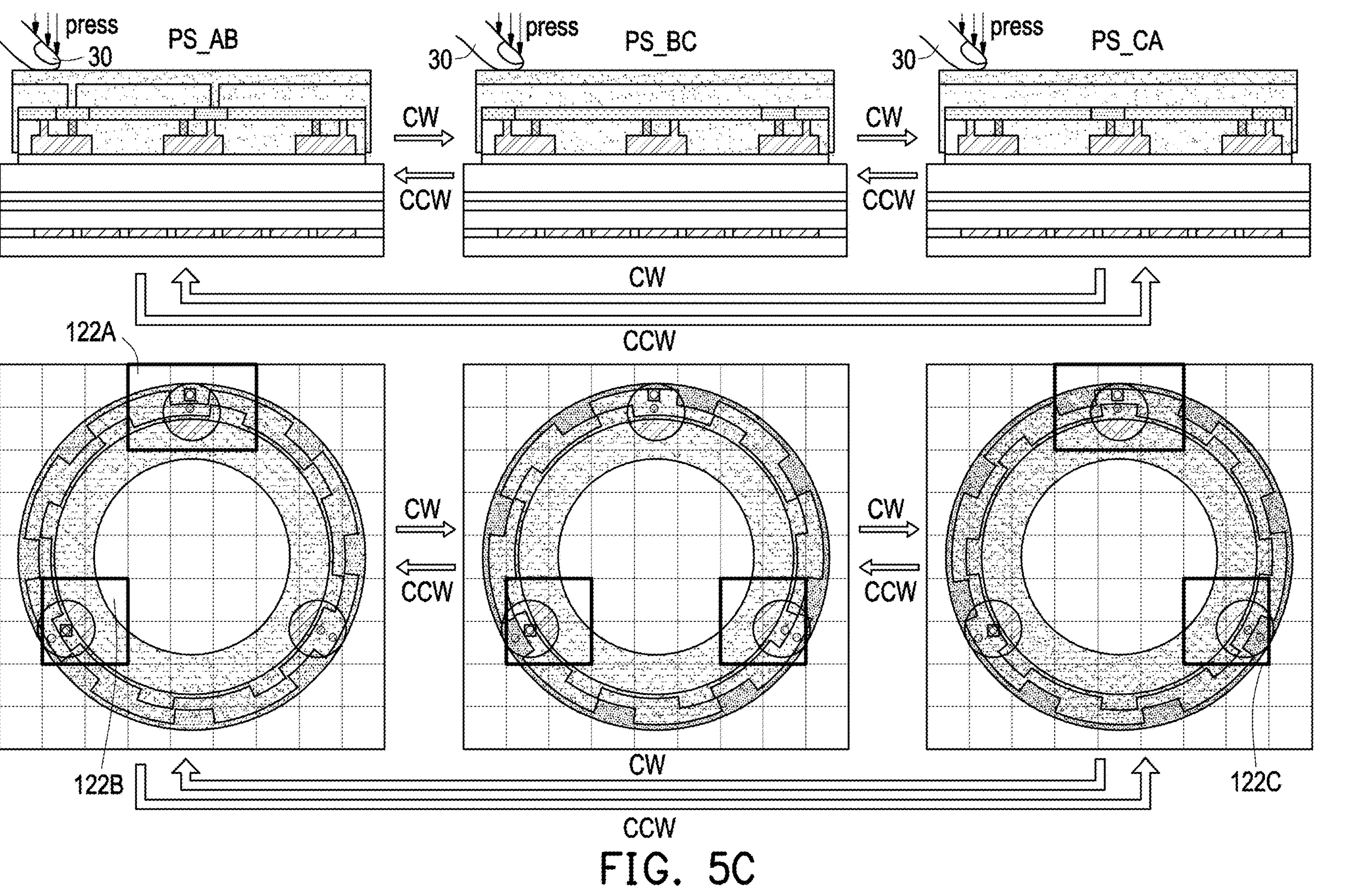

FIG. 5A, FIG. 5B, and FIG. 5C are schematic diagrams illustrating the knob press operation of the knob device 110 according to an embodiment of the invention. Referring to FIG. 5A to FIG. 5C, FIG. 5A shows top views of the knob device 110 in different press states PS_AB, PS_BC, PS_CA, and FIG. 5C shows cross-sectional views and corresponding top views of the knob device 110 in the different press states PS_AB, PS_BC, PS_CA. In addition, the conduction states of the conductive pads 401A, 401B, 401C in the different press states PS_AB, PS_BC, PS_CA are shown in FIG. 5B.

The first conductive part CP1, the second conductive part CP2, and the conductive pads 401A, 401B, 401C with the interconnects ICR and ICP are connectable to provide a plurality of press states PS_AB, PS_BC, PS_CA in response to a press operation. With the rotary wheel and interconnectors design, in addition to the first conductive part CP1 being controlled to connect to only one of the conductive pads 401A, 401B, 401C, the second conductive part CP2 is controlled to connect to a different one of the conductive pads 401A, 401B, 401C during pressing. The press states are defined as PS_AB, PS_BC, PS_CA and correspond to the rotation states RS_A, RS_B, RS_C, respectively. The press states PS_AB, PS_BC, PS_CA includes any two of the three conductive pads 401A, 401B, 401C being conducted with the first conductive part CP1 and/or the second conductive part CP2.

In the press state PS_AB, the conductive pad 401A is connected to the first conductive part CP1 via its interconnector ICR, and the second conductive pad 401B is connected to the second conductive part CP2 via its interconnector ICP, as shown with "ON" in FIG. 5B. "OFF" (logic 0) indicates that the conductive pad 401C is not connected to the first conductive part CP1 and the second conductive part CP2 in the press state PS_AB.

Similarly, in the press state PS_BC, the conductive pads 401B and 401C respectively are connected to the first conductive part CP1 and the second conductive part CP2, and the conductive pad 401A is not connected to the first conductive part CP1 and the second conductive part CP2. In the press state PS_CA, the conductive pads 401C and 401A respectively are connected to the first conductive part CP1 and the second conductive part CP2, and the conductive pad 401B is not connected to the first conductive part CP1 and the second conductive part CP2.

Referring to FIG. 5C, when the user 30 presses the knob cap 111, the finger touches the conductive surface CS, which extends the finger potential to two of the conductive pads 401A, 401B, 401C through the conductors. The touch sensors 122 corresponding to these two pads can sense the capacitance change, while the other one pad is not connected, and the touch sensors 122 corresponding to this pad cannot detect the capacitance change. If the user does not press the knob cap 111 and stays in one of the rotation states, only the capacitance change is sensed under one of the conductive pads. The controller 130 with the touch algorithm can use this feature to detect whether the knob cap 111 is pressed and the current press state.

To be specific, when the user 30 presses the knob cap 111, and the conductive surface CS is selectively coupled to the conductive pads 401A and 401B, the controller 130 detects that a press operation occurs at the position of the conductive pad 401B of the touch panel 120. The touch sensors 122A and 122B corresponding to the conductive pads 401A and 401B can sense the capacitance change, but the touch sensors 122C corresponding to the conductive pad 401C cannot sense the capacitance change. At this time, the controller 130 converts the detection results into a digital code "110" (i.e., state PS_AB shown in FIG. 5B). Similarly, when the user 30 presses the knob cap 111, and the conductive surface CS is selectively coupled to the conductive pads 401B and 401C, the controller 130 converts the detection results into a digital code "011" (i.e., state PS_BC shown in FIG. 5B). The digital code "011" indicates that a press operation occurs at the position of the conductive pad 401C. When the user 30 presses the knob cap 111, and the conductive surface CS is selectively coupled to the conductive pads 401C and 401A, the controller 130 converts the detection results into a digital code "101" (i.e., state PS_CA shown in FIG. 5B). The digital code "101" indicates that a press operation occurs at the position of the conductive pad 401A. The controller 130 can determine whether the knob cap 111 has been pressed, and then determines the pressed position according to the detected logic code.

In an embodiment, the controller 130 can also detect the rotation operation under the press operation. That is to say, the user 30 presses and rotates the knob cap 111 at the same time. As described above, the rotation states RS_A, RS_B, RS_C respectively correspond to the press states PS_AB, PS_BC, PS_CA. Under continuous pressing, the press states PS_AB, PS_BC, PS_CA also have a fixed and cyclic sequence same as the rotation states RS_A, RS_B, RS_C. The controller 130 can detect the rotation operation under the press operation according to the press state switching sequence.

For example, when the current code and the previous code indicate that the switching sequence is a third sequence (e.g., state PS_AB "110"→state PS_BC "011"→state PS_CA "101"→state RS_AB "110"), the controller 130 determines the rotation direction of the knob cap 111 is clockwise under the press operation. When the current code and the previous code indicate that the switching sequence is a fourth sequence (e.g., state PS_CA "101"→state PS_BC "011"→state PS_AB "110"→state PS_CA "101"), the controller 130 determines that the rotation direction of the knob cap 111 is counterclockwise under the press operation.

That is to say, the first conductive part CP1, the second conductive part CP2, and the conductive pads 401A, 401B, 401C with the interconnects ICR and ICP are connectable to provide a plurality of rotation states in response to a rotation operation under the press operation.

In FIG. 4C and FIG. 5C, the rotation operation and the press operation of the knob device 110 are respectively illustrated. The rotation states and the press states can be determined according to the conduction states of the conductive pads 401A, 401B, 401C of the bottom layer 301. In another embodiment, the knob device may be designed to have a pull function. The user can pull the knob device to perform a specified operation. The rotation states and the pull states can also be determined according to the conduction states of the conductive pads of the bottom layer. In addition, the controller can determine the rotation direction under the pull operation.

Figure 6:
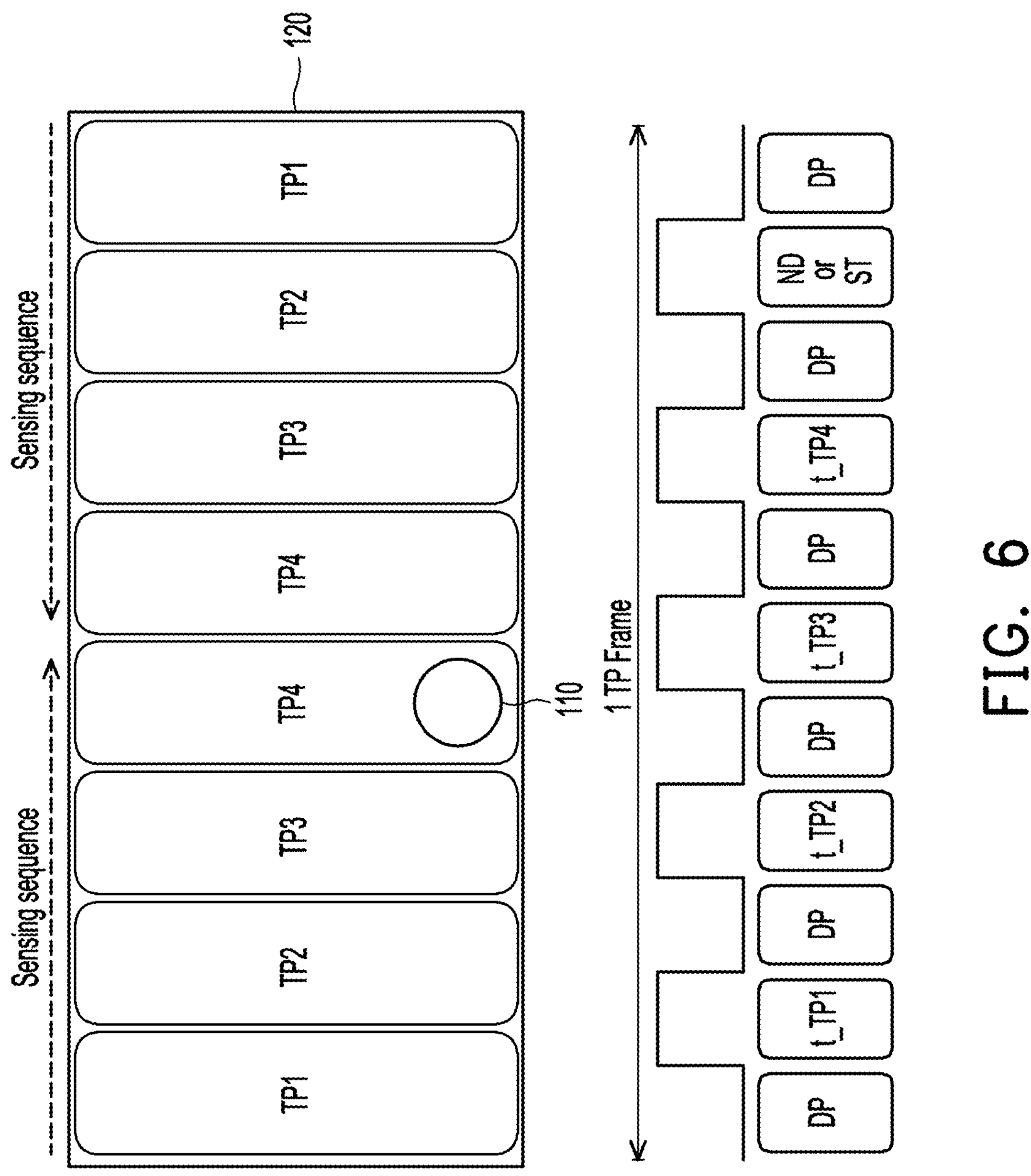
FIG. 6 is a diagram illustrating a timing sequence for driving the knob device according to an embodiment of the invention.

FIG. 6 is a diagram illustrating a timing sequence for driving the knob device 110 according to an embodiment of the invention. Referring to FIG. 6, the touch panel 120 includes a plurality of touch sensing blocks TP1 to TP4. The knob device 110 is disposed on the touch sensing block TP4. In the periods DP, the controller 130 performs a display driving operation. In the periods t_TP1, t_TP2, t_TP3, t_TP4, the controller 130 performs a touch sensing operation. The controller 130 can finish the knob function detection in the period t_TP4. In the period ND or ST, the controller 130 performs a noise detecting operation or stands by.

Figure 7:
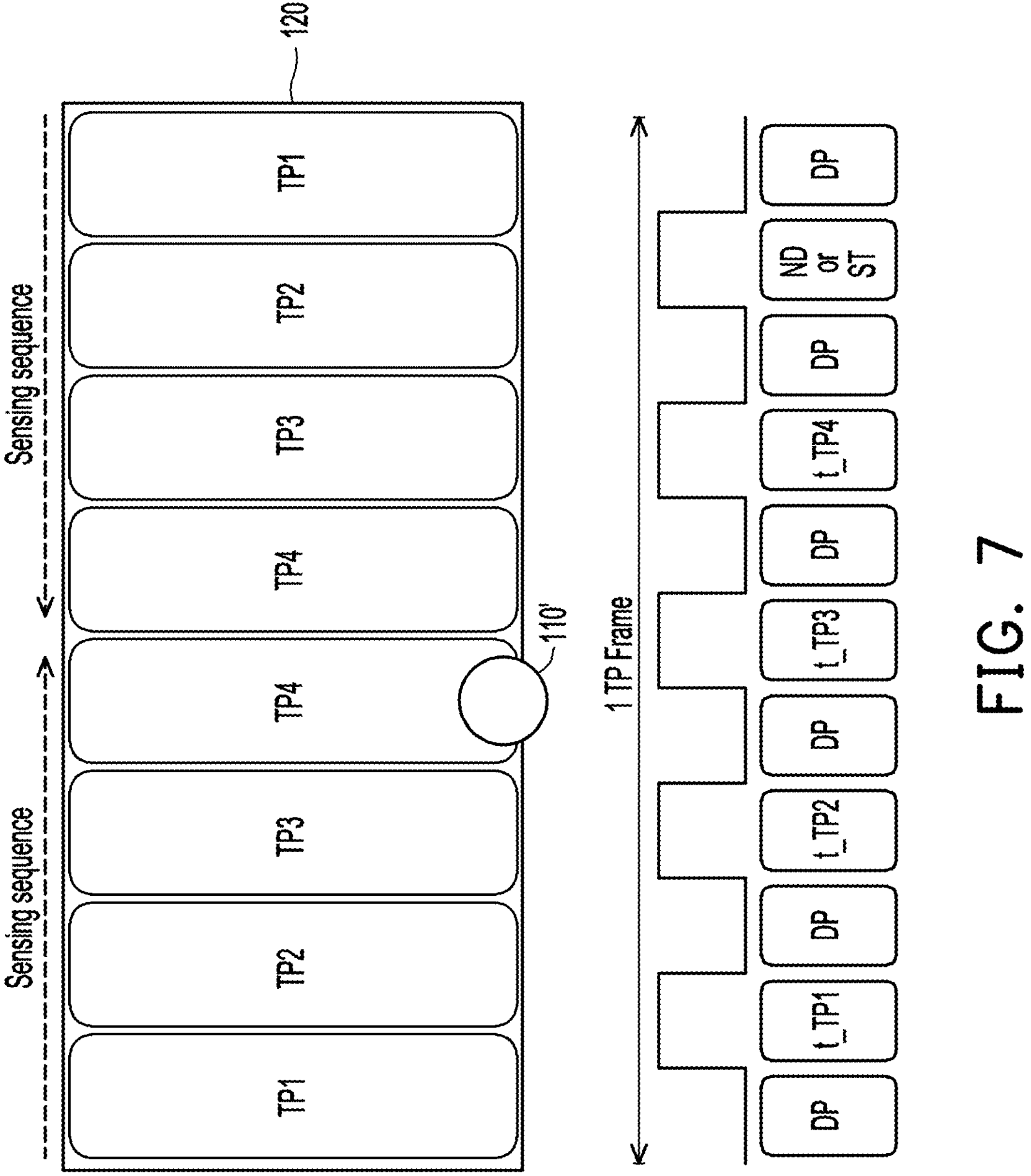
FIG. 7 is a diagram illustrating a timing sequence for driving the knob device according to another embodiment of the invention.

FIG. 7 is a diagram illustrating a timing sequence for driving the knob device 110' according to another embodiment of the invention. Referring to FIG. 7, a part of the knob device 110' is disposed on the active area, and a part of the knob device 110' is disposed outside of the active area. The conductive pads 401A, 401B, 401C are designed to be arranged in the active area. The controller 130 can still finish the knob function detection in the period t_TP4.

Figure 8A:
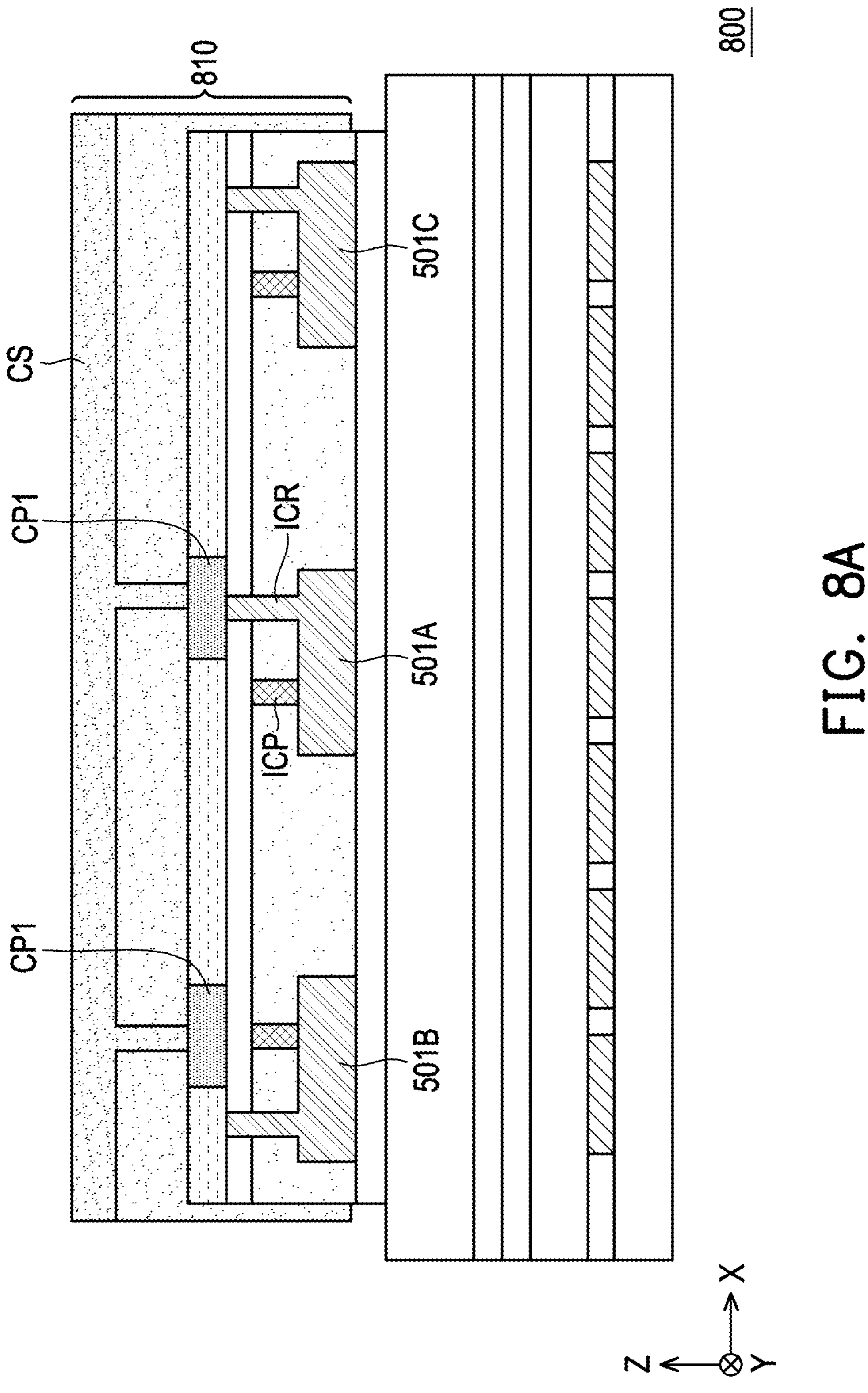
FIG. 8A is a cross-sectional view of a touch apparatus according to another embodiment of the invention.
Figure 8B:
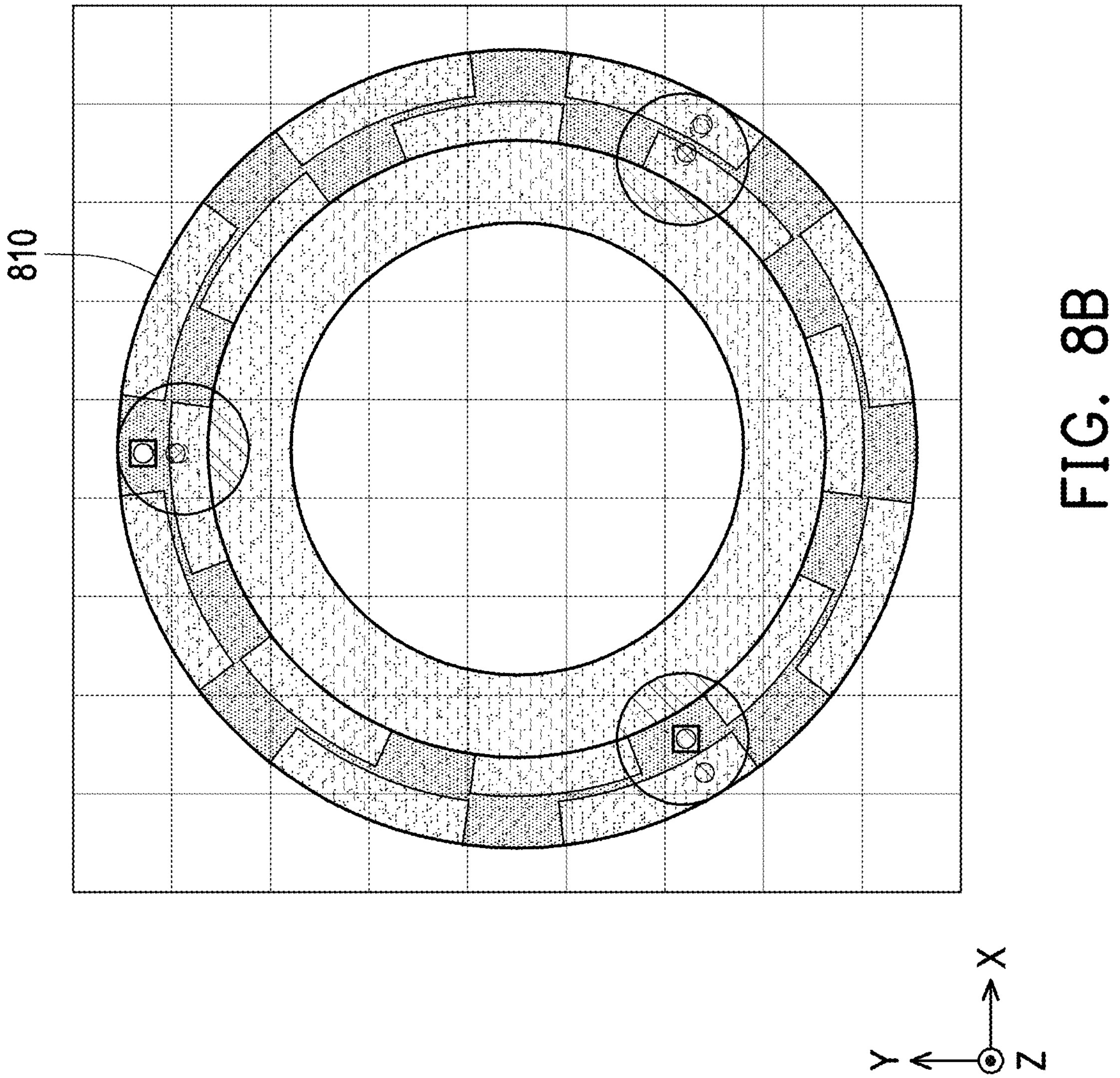
FIG. 8B is a top view of the touch apparatus of FIG. 8A according to an embodiment of the invention.
Figure 8C:
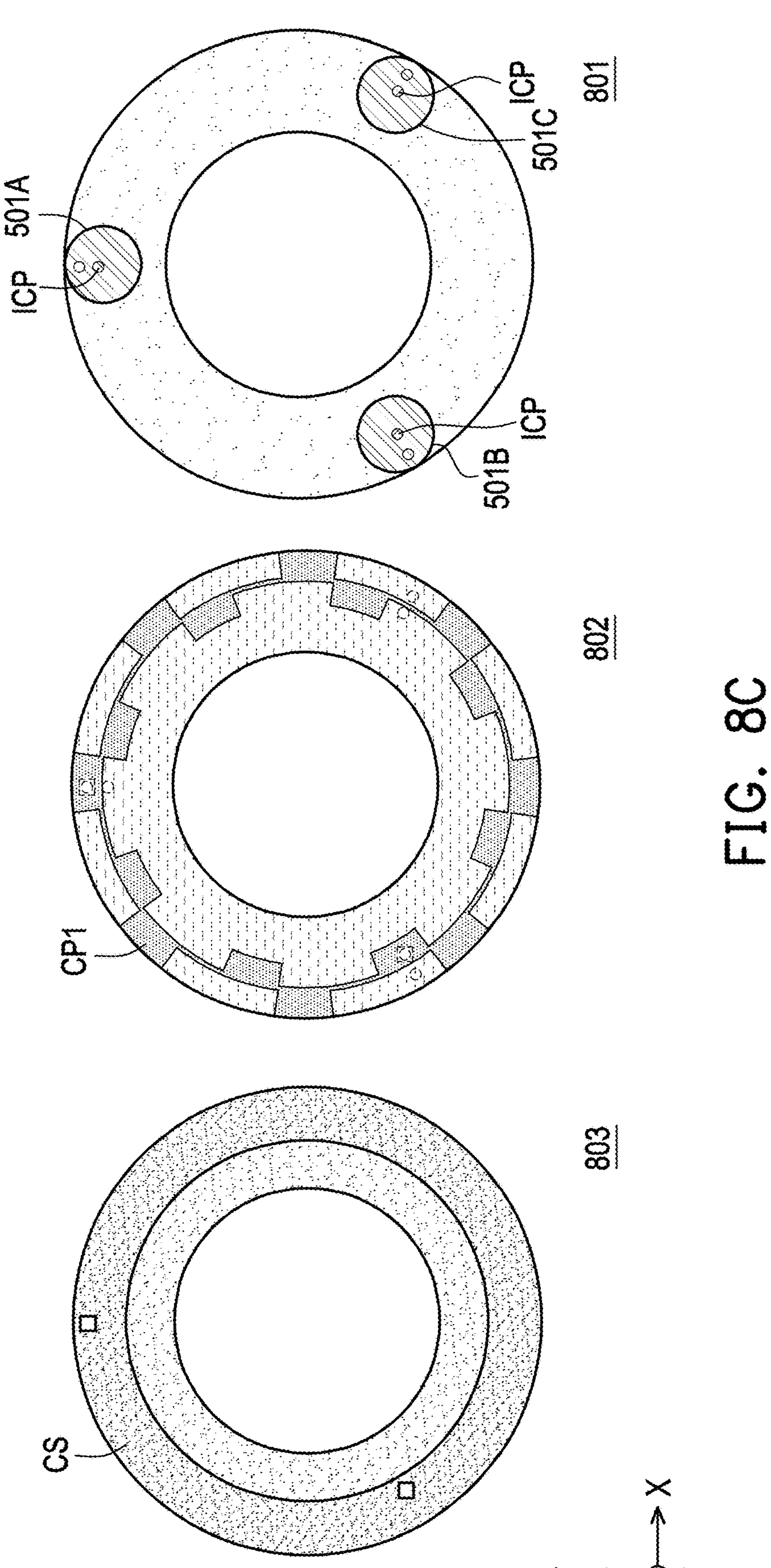
FIG. 8C is a top view of layers of the knob device of FIG. 8A according to an embodiment of the invention.

FIG. 8A is a cross-sectional view of a touch apparatus according to another embodiment of the invention. FIG. 8B is a top view of the touch apparatus of FIG. 8A according to an embodiment of the invention. FIG. 8C is a top view of layers of the knob device of FIG. 8A according to an embodiment of the invention.

Referring to FIG. 8A to FIG. 8C, the touch apparatus 800 includes a knob device 810, and the knob device 810 includes a top layer 803, a middle layer 802, and a bottom layer 801. The structures of the top layer 803 and the bottom layer 801 are the same as those of the top layer 303 and the bottom layer 301, but the structure of the middle layer 802 is different from that of the middle layer 302. The conductor area of the middle layer 802 only includes a first conductive part CP1, and the first conductive part CP1 is connected to the conductive surface CS. The first conductive part CP1 and the conductive pads 501A, 501B, 501C with the interconnects ICP are connectable to provide a plurality of press states in response to a press operation. In addition, the first conductive part CP1 and the conductive pads 501A, 501B, 501C with the interconnects ICP are also connectable to provide a plurality of rotation states in response to a rotation operation under a press operation.

In the present embodiment, the first conductive part CP1 of the middle layer 802 can be deem as a combination of the first conductive part CP1 and the second conductive part CP2 of the middle layer 302, and forms a whole of the conductor area of the middle layer 802.

Figure 9A:
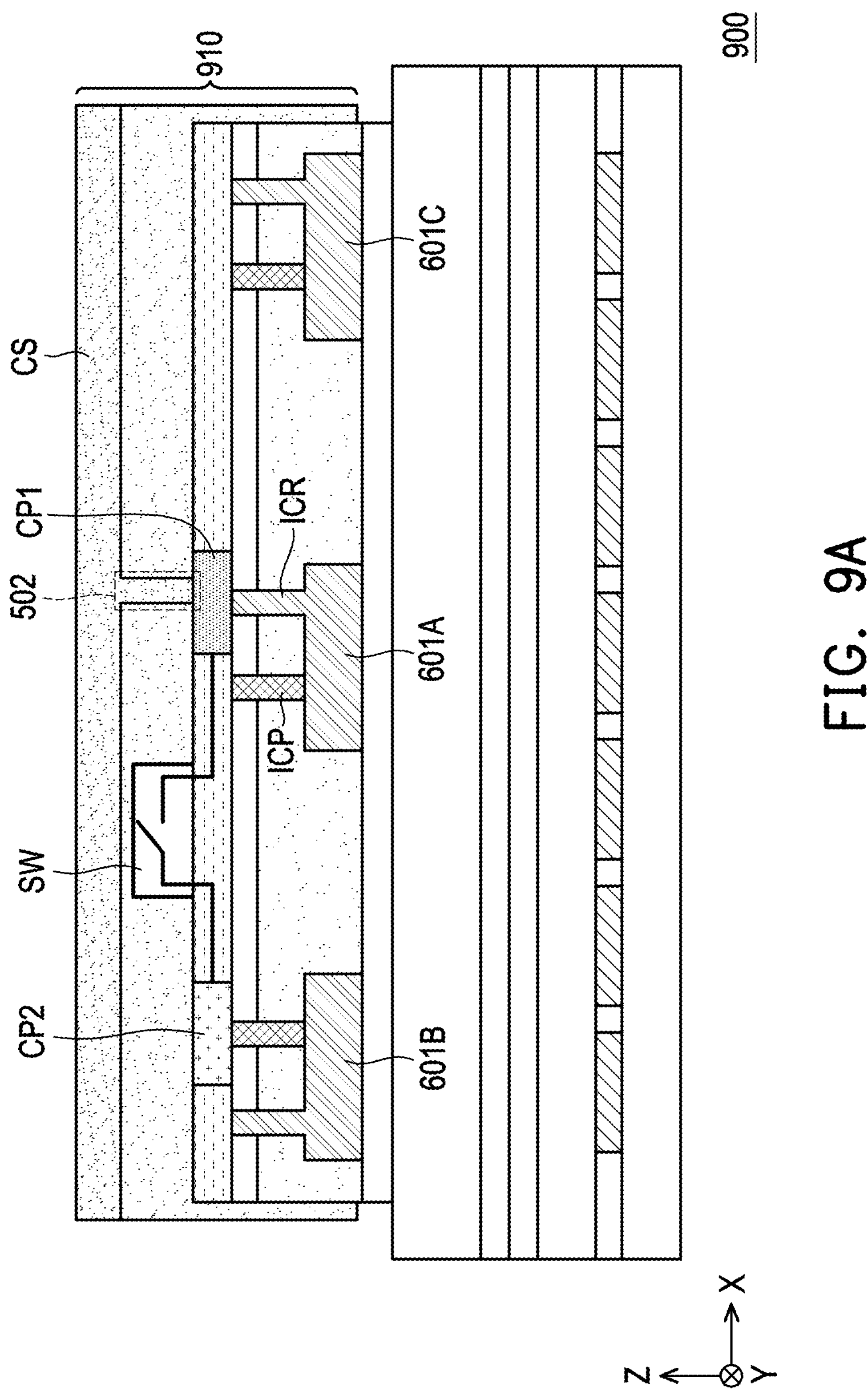
FIG. 9A is a cross-sectional view of a touch apparatus according to another embodiment of the invention.
Figure 9B:
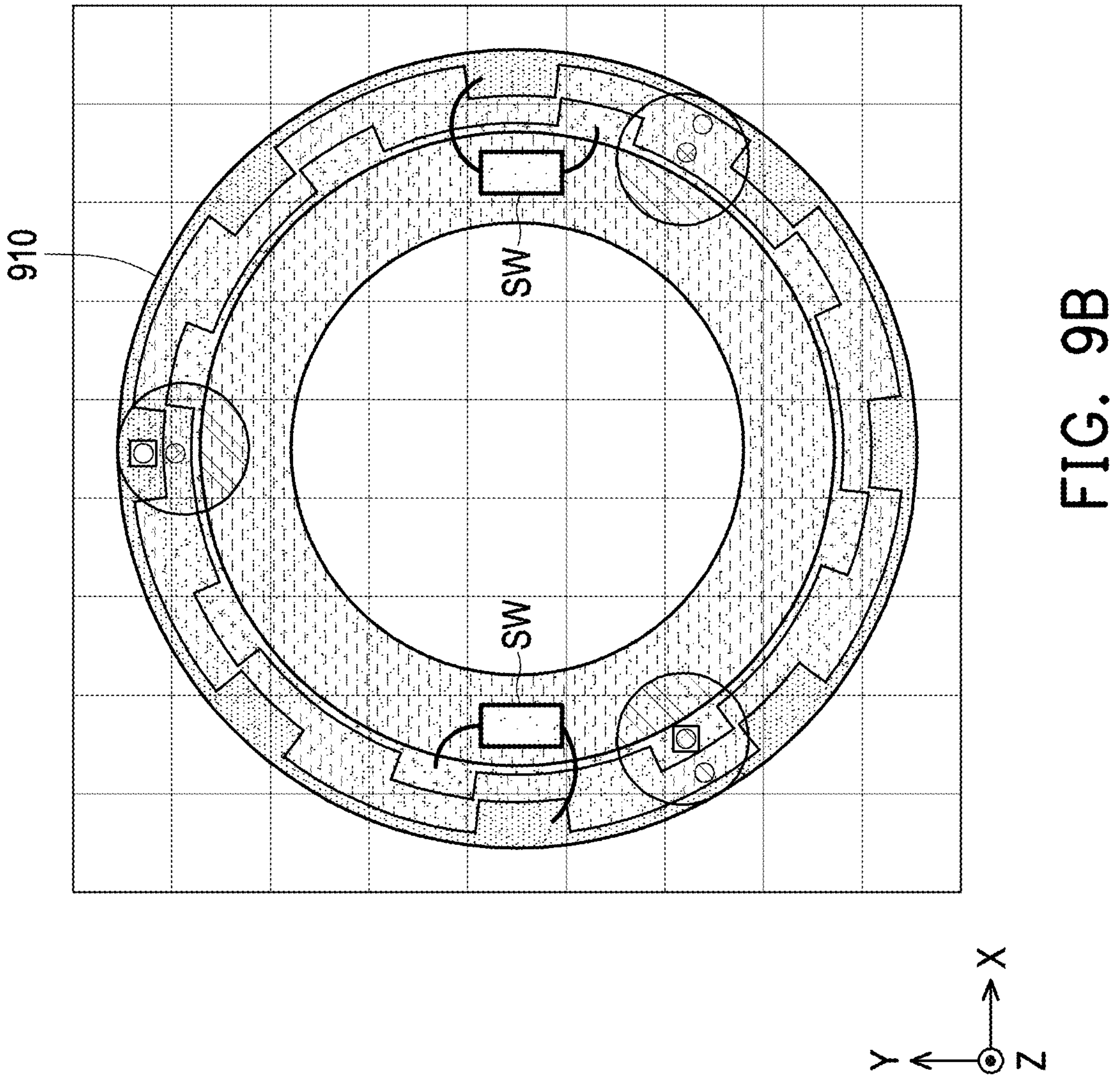
FIG. 9B is a top view of the touch apparatus of FIG. 9A according to an embodiment of the invention.
Figure 9C:
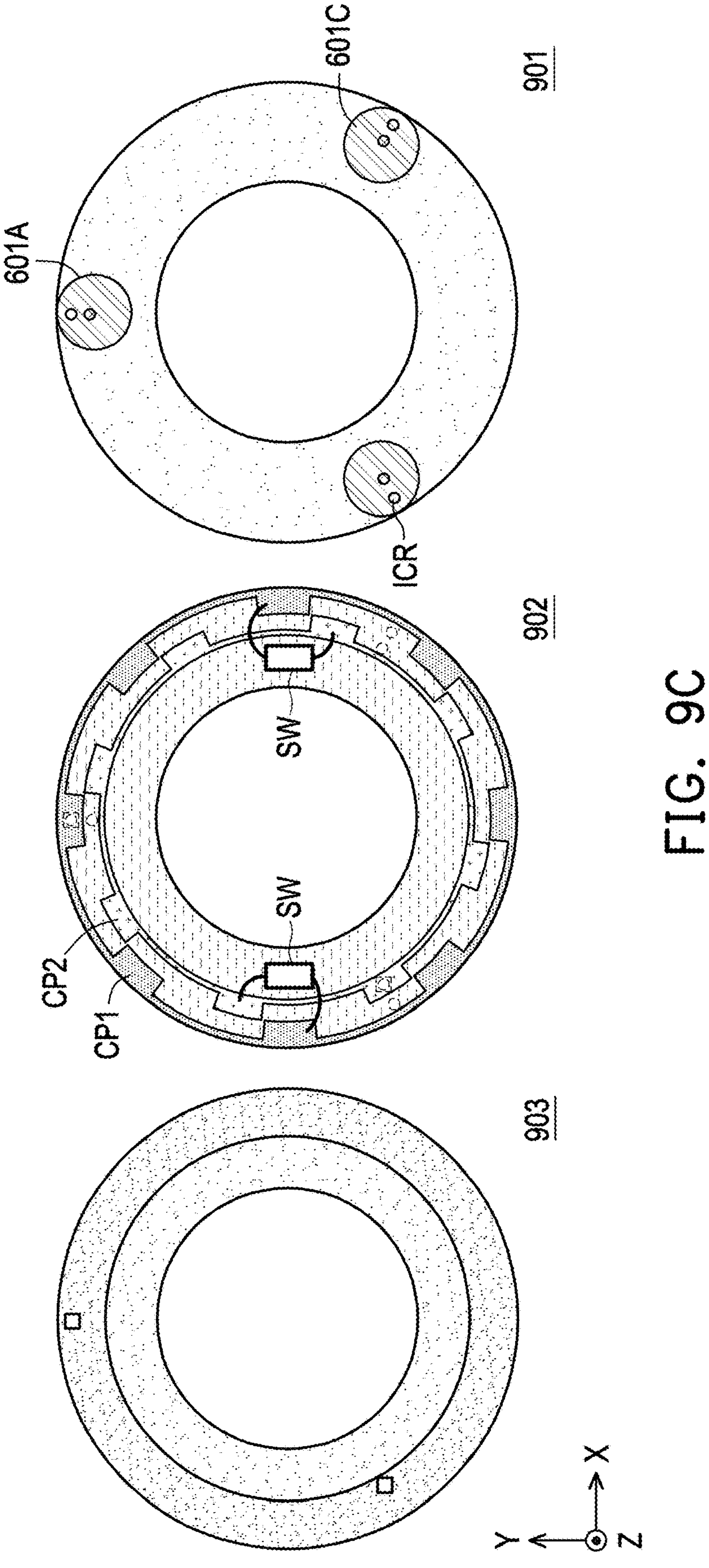
FIG. 9C is a top view of layers of the knob device of FIG. 9A according to an embodiment of the invention.

FIG. 9A is a cross-sectional view of a touch apparatus according to another embodiment of the invention. FIG. 9B is a top view of the touch apparatus of FIG. 9A according to an embodiment of the invention. FIG. 9C is a top view of layers of the knob device of FIG. 9A according to an embodiment of the invention.

Referring to FIG. 9A to FIG. 9C, the touch apparatus 900 includes a knob device 910, and the knob device 910 includes a top layer 903, a middle layer 902, and a bottom layer 901. The structure of the middle layer 902 is similar to that of the middle layer 302, but the middle layer 902 is further equipped with at least one switch device SW.

The switch device SW is disposed on the middle layer 902. The first conductive part CP1 is connected to the conductive surface CS via the conductive pillar 502. The second conductive part CP2 is not directly connected to the conductive surface CS. The switch device SW is configured to connect the first conductive part CP1 and the second conductive part CP2 in response to the press operation. For example, the switch device SW connects the first conductive part CP1 to the second conductive part CP2 when the knob device 910 is pressed, and to disconnect them when the knob device 910 is not pressed.

In addition, the three conductive pads 601A, 601B, 601C each have a first interconnector ICR and a second interconnector ICP, both of which are equal in height. For example, the first interconnector ICR and the second interconnector ICP of the conductive pad 601A have the same height.

The methods of detecting rotation, press and press-rotation as exemplarily disclosed in FIG. 4A to FIG. 7 can be applied to the structures of FIG. 8A and FIG. 9A. All of the structures of FIG. 1, FIG. 8A and FIG. 9A can solve the problem of related arts not being able to press down to rotate, and the function is the same.

Figure 10A:
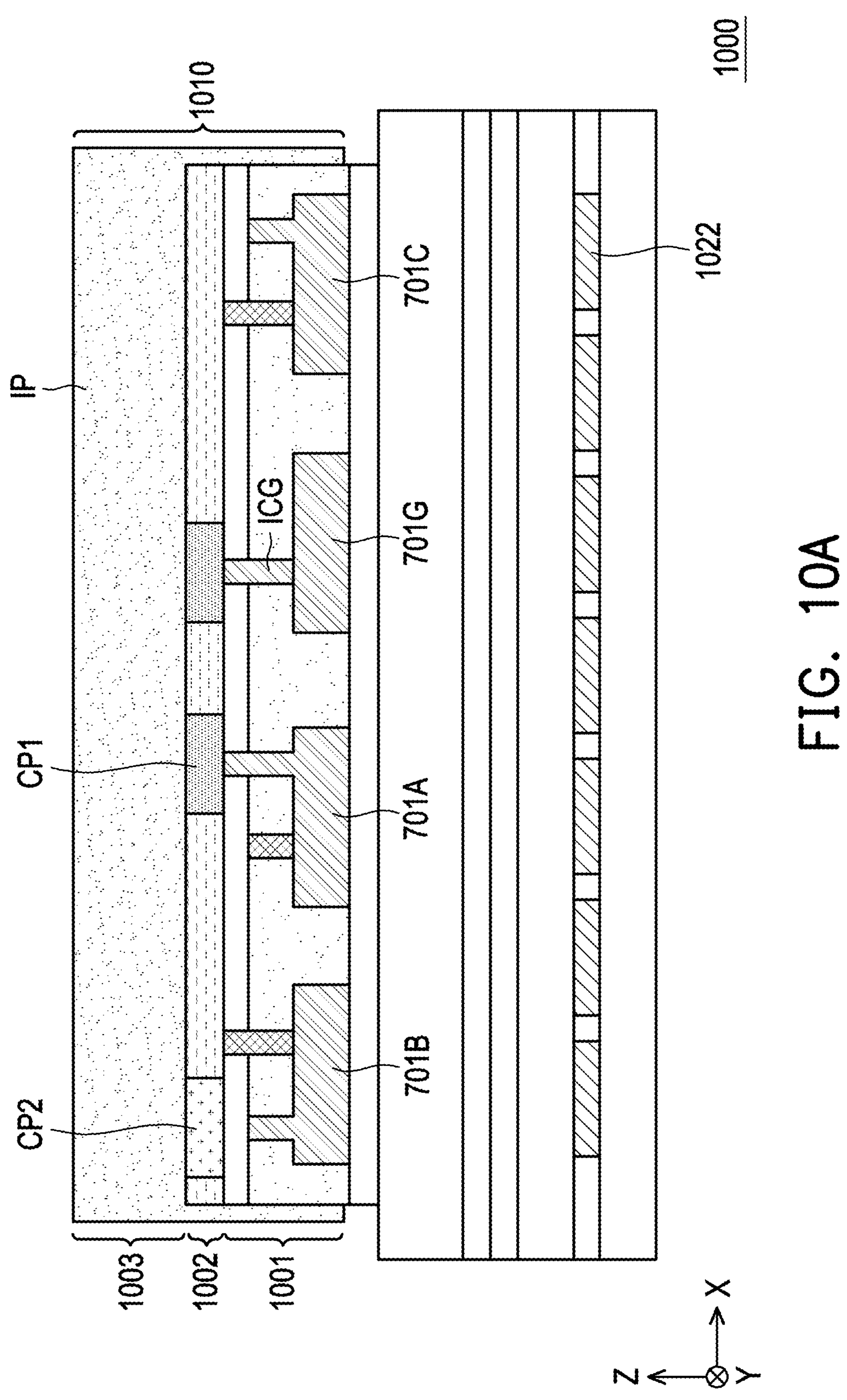
FIG. 10A is a cross-sectional view of a touch apparatus according to another embodiment of the invention.
Figure 10B:
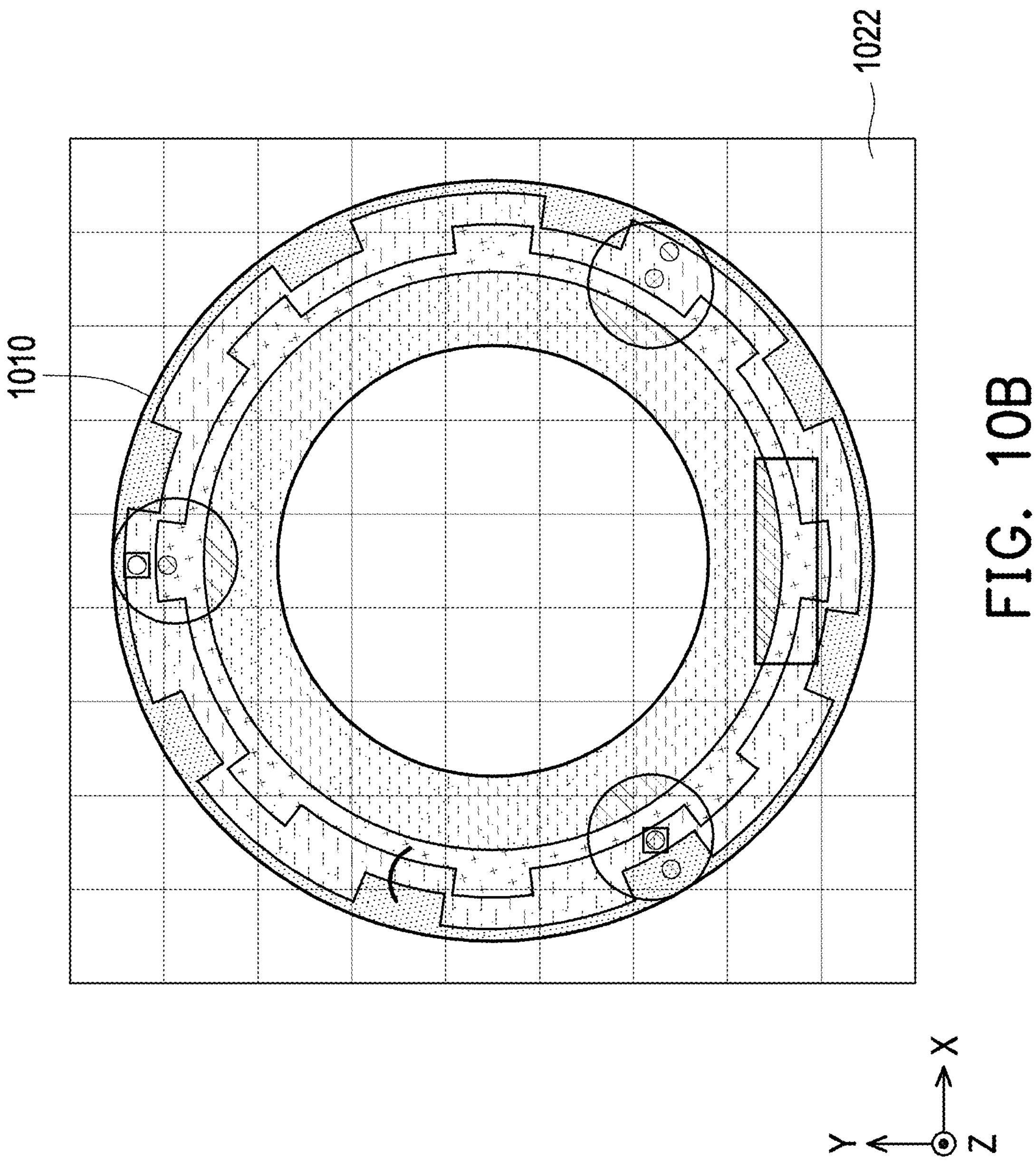
FIG. 10B is a top view of the touch apparatus of FIG. 10A according to an embodiment of the invention.
Figure 10C:
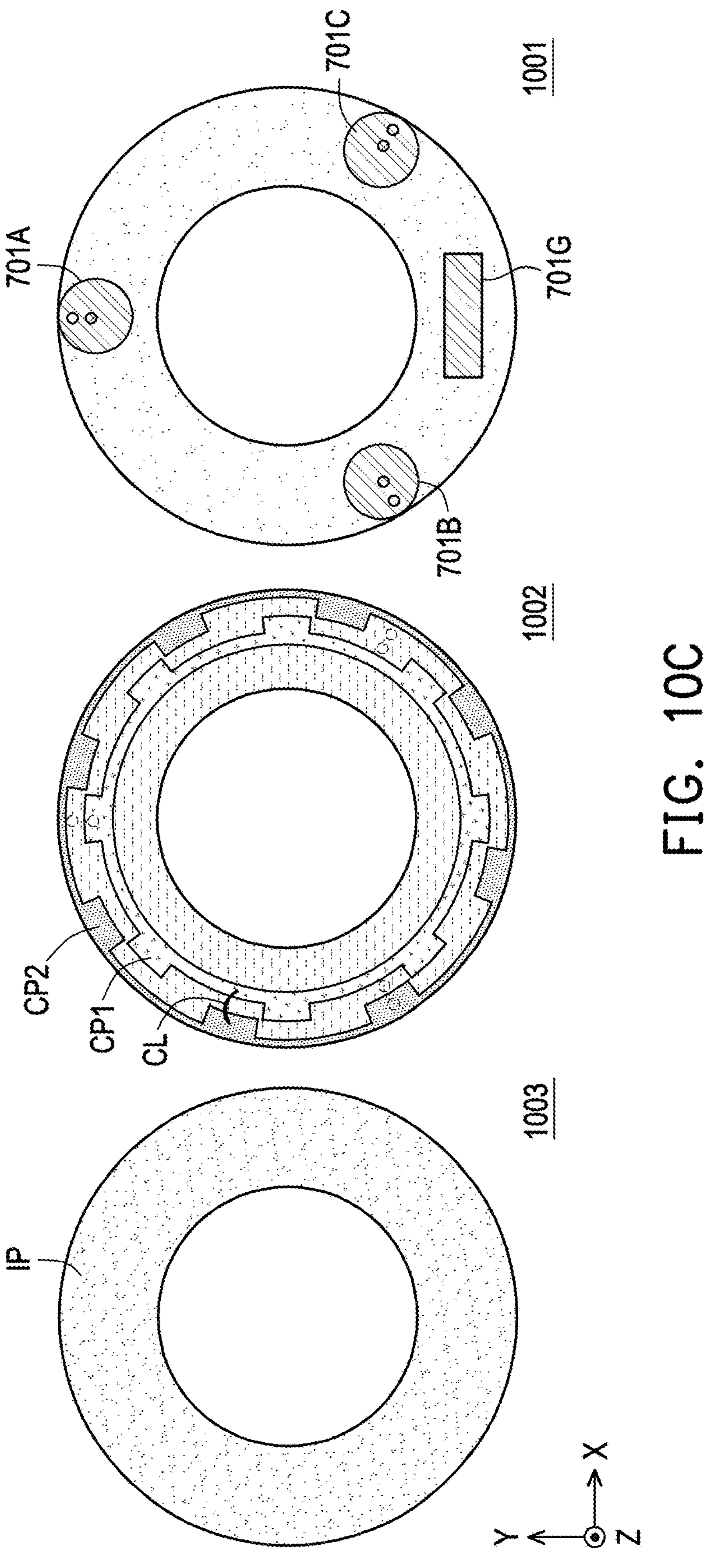
FIG. 10C is a top view of layers of the knob device of FIG. 10A according to an embodiment of the invention.

FIG. 10A is a cross-sectional view of a touch apparatus according to another embodiment of the invention. FIG. 10B is a top view of the touch apparatus of FIG. 10A according to an embodiment of the invention. FIG. 10C is a top view of layers of the knob device of FIG. 10A according to an embodiment of the invention.

Referring to FIG. 10A to FIG. 10C, the touch apparatus 1000 includes a knob device 1010, and the knob device 1010 includes a top layer 1003, a middle layer 1002, and a bottom layer 1001. The top layer 1003 of the knob device 1010 is an insulating part IP. In an embodiment, a portion of the base of the insulating part IP can be designed with decorative metal that is not connected to the middle layer 1002, and the bottom layer 1001, depending on the knob's shape.

In the middle layer 1002, the first conductive part CP1 and the second conductive part CP2 are connected via a conductive line CL. The bottom layer 1001 further includes a ground pad (second conductive pad) 701G. The ground pad 701G is connected to the first conductive part CP1 via an interconnector ICG. The three conductive pads 701A, 701B, 701C each have a first interconnector ICR and a second interconnector ICP, both of which are not equal in height.

When the user rotates the knob device 1010, the touch sensors 1022 under the ground pad 701G outputs ground signals and are capacitively coupled to the ground pad 701G, and the ground potential extends to one of the conductive pads 701A, 701B, 701C through the conductors. The touch sensors 1022 on the bottom of this pad can sense the capacitance change, while the other two pads are not connected and cannot detect the capacitance change. The controller 130 with the touch algorithm can use this feature to detect the rotation state and determine the rotation direction.

When the user presses the knob device 1010, the touch sensors 1022 under the ground pad 701G outputs ground signals and are capacitively coupled to the ground pad 701G, and the ground potential extends to two of the conductive pads 701A, 701B, 701C through the conductors. The touch sensors 1022 on the bottom of these two pads can sense the capacitance change, while the other pad is not connected and cannot detect the capacitance change. If the user does not press the knob device 1010 and stays in one of the rotation states, only the capacitance change is sensed under one of the conductive pads. The controller 130 with the touch algorithm can use this feature to detect whether the knob device 1010 is pressed and the press state.

In an embodiment, the controller 130 can also detect the rotation operation under the press operation using the knob device 1010 according to the press state switching sequence.

Figure 11:
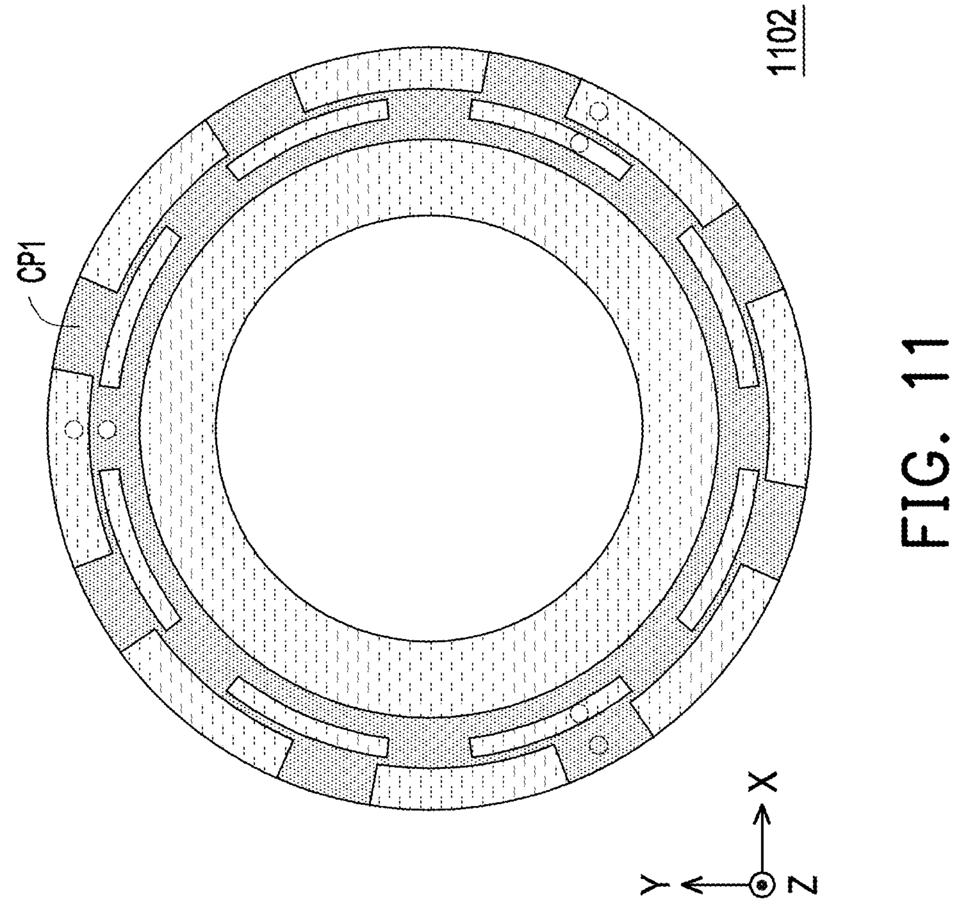
FIG. 11 is a top view of the middle layer of the knob device of FIG. 10A according to another embodiment of the invention.

FIG. 11 is a top view of the middle layer of the knob device of FIG. 10A according to another embodiment of the invention. Referring to FIG. 11, the conductor area of the middle layer 1102 only includes a first conductive part CP1. The first conductive part CP1 of the middle layer 1102 can be deem as a combination of the first conductive part CP1 and the second conductive part CP2 of the middle layer 1002, and forms a whole of the conductor area of the middle layer 1102.

Figure 12A:
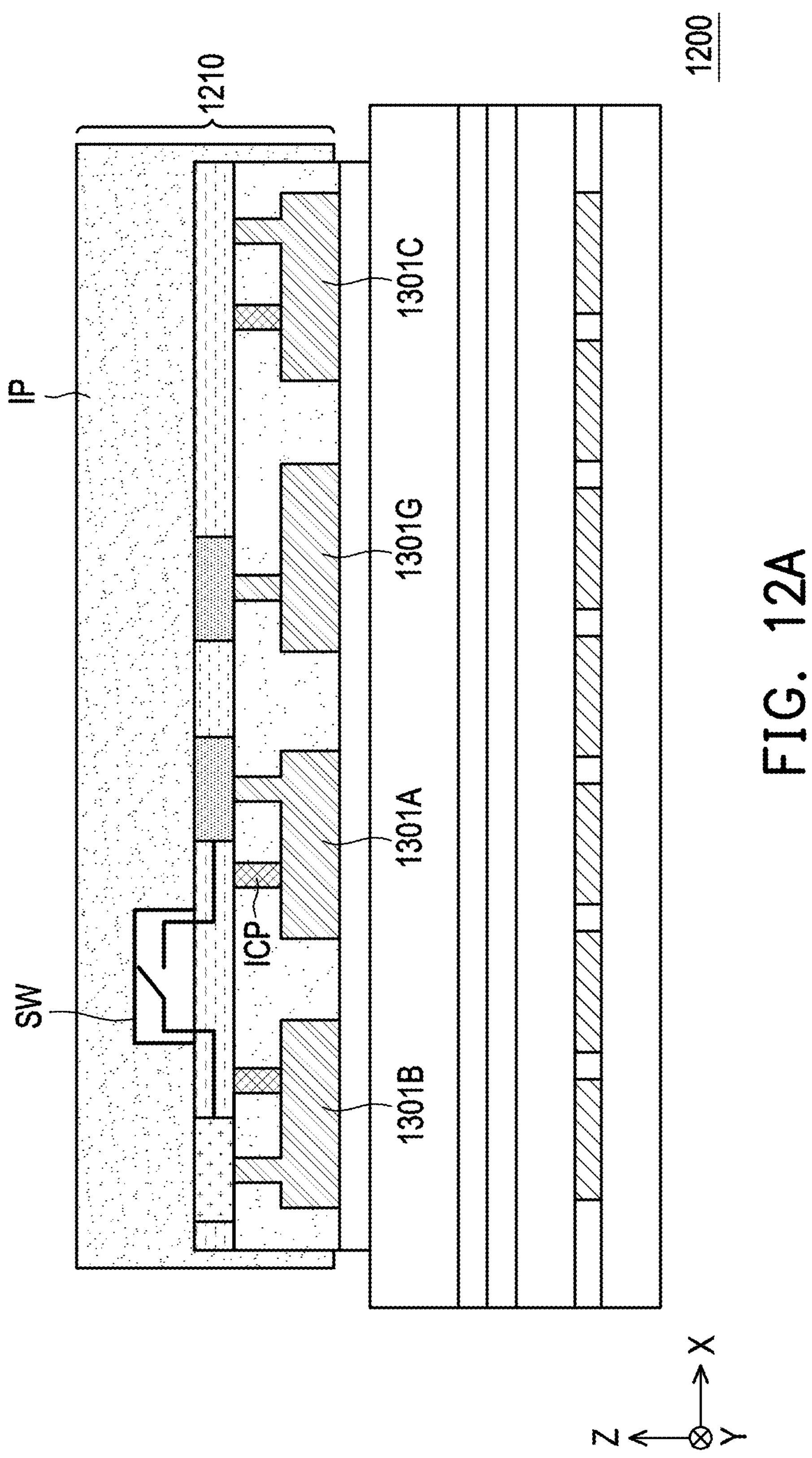
FIG. 12A is a cross-sectional view of a touch apparatus according to another embodiment of the invention.
Figure 12B:
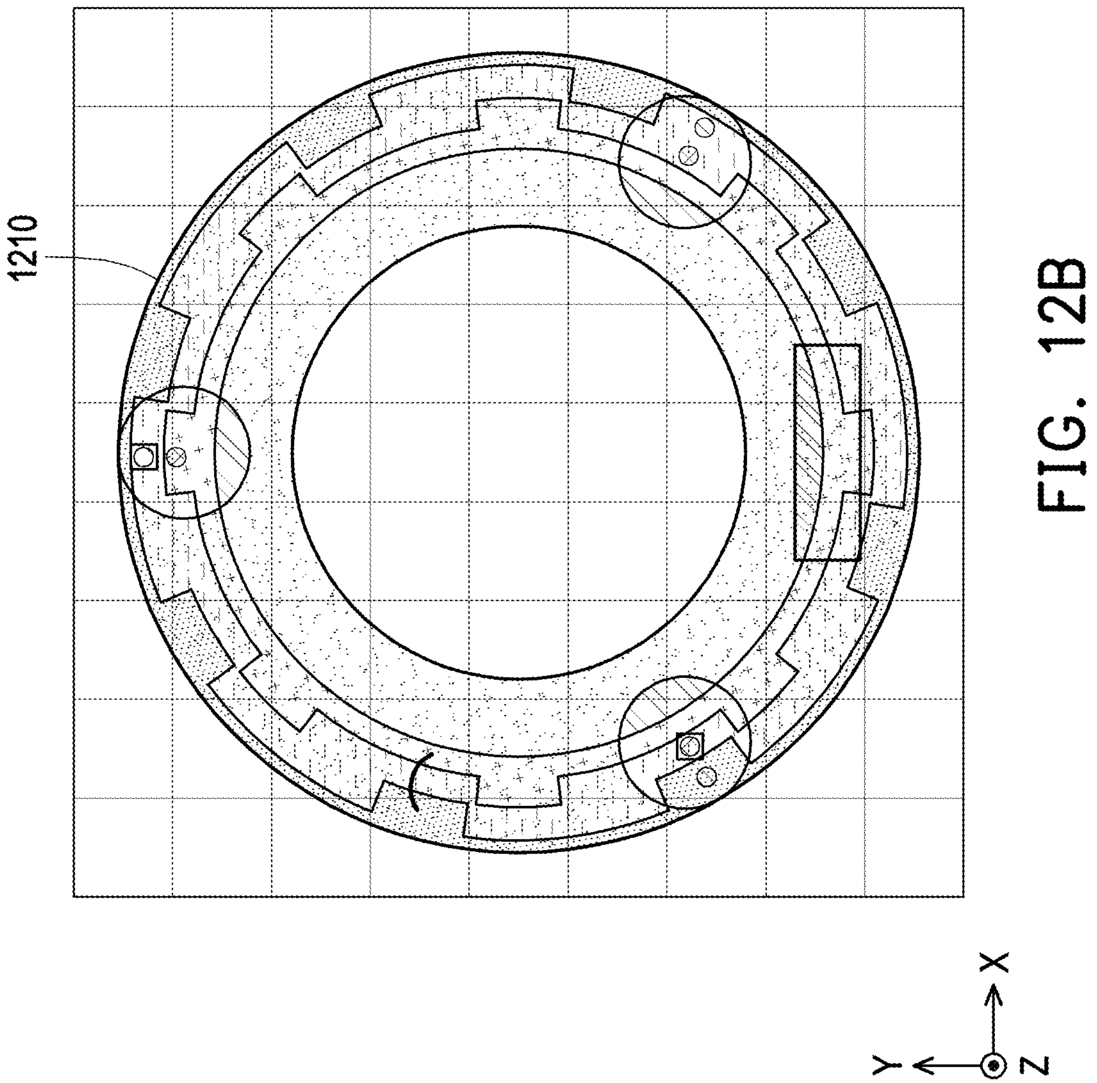
FIG. 12B is a top view of the touch apparatus of FIG. 12A according to an embodiment of the invention.
Figure 12C:
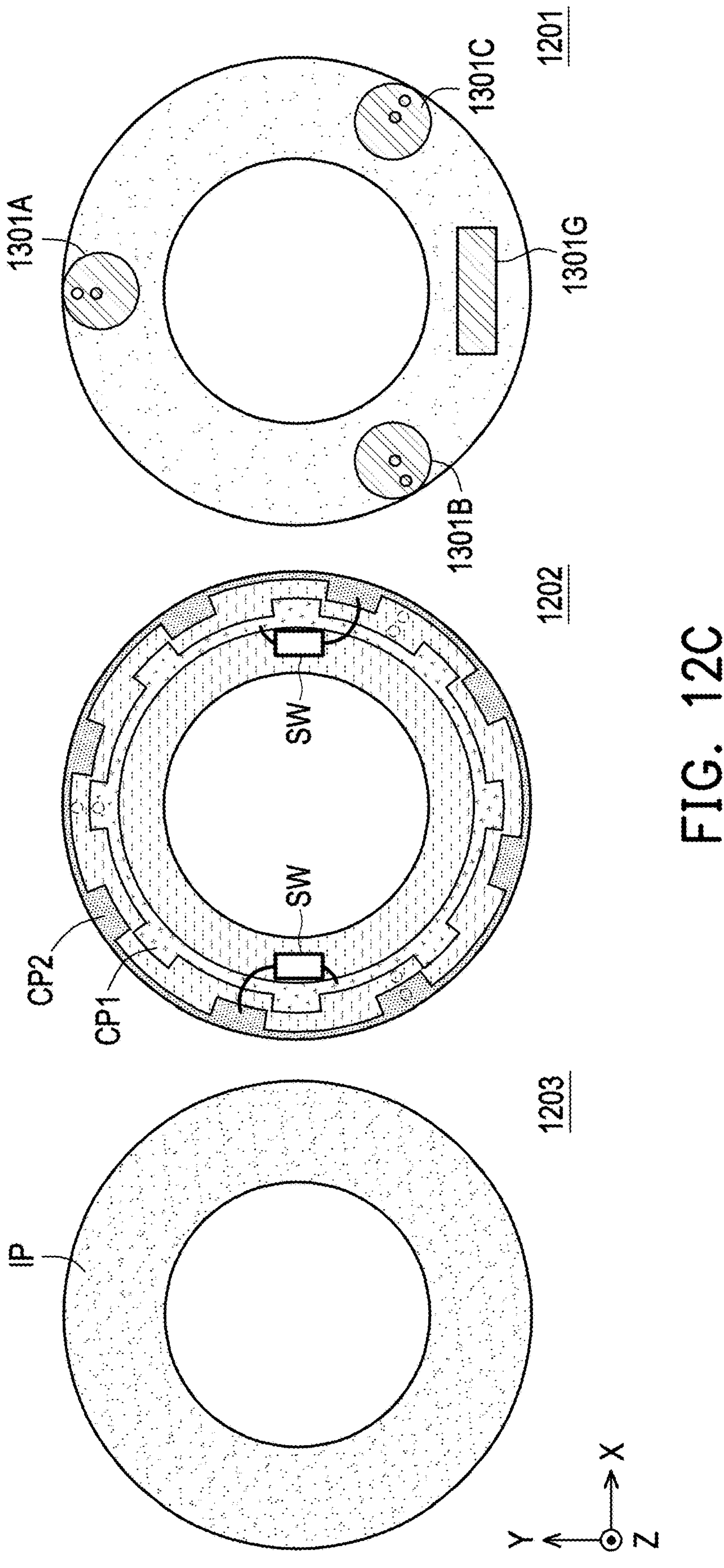
FIG. 12C is a top view of layers of the knob device of FIG. 12A according to an embodiment of the invention.

FIG. 12A is a cross-sectional view of a touch apparatus according to another embodiment of the invention. FIG. 12B is a top view of the touch apparatus of FIG. 12A according to an embodiment of the invention. FIG. 12C is a top view of layers of the knob device of FIG. 12A according to an embodiment of the invention.

Referring to FIG. 12A to FIG. 12C, the touch apparatus 1200 includes a knob device 1210, and the knob device 1210 includes a top layer 1203, a middle layer 1202, and a bottom layer 1201. The structure of the middle layer 1202 is similar to that of the middle layer 302, but the middle layer 1202 is further equipped with at least one switch device SW.

The switch device SW is disposed on the middle layer 1202. The first conductive part CP1 is connected to the ground pad 1301G. The second conductive part CP2 is not connected to the ground pad 1301G. The switch device SW is configured to connect the first conductive part CP1 and the second conductive part CP2 in response to the press operation. For example, the switch device SW connects the first conductive part CP1 to the second conductive part CP2 when the knob device 1210 is pressed, and to disconnect them when the knob device 1210 is not pressed.

In addition, the three conductive pads 1301A, 1301B, 1301C each have a first interconnector ICR and a second interconnector ICP, both of which are equal in height. For example, the first interconnector ICR and the second interconnector ICP of the conductive pad 1301A have the same height.

The methods of detecting rotation, press and press-rotation as exemplarily disclosed in FIG. 4A to FIG. 7 can be applied to the structures of FIG. 10A, FIG. 11 and FIG. 12A. All of the structures of FIG. 10A, FIG. 11 and FIG. 12A can solve the problem of related arts not being able to press down to rotate, and the function is the same.

Figure 13:
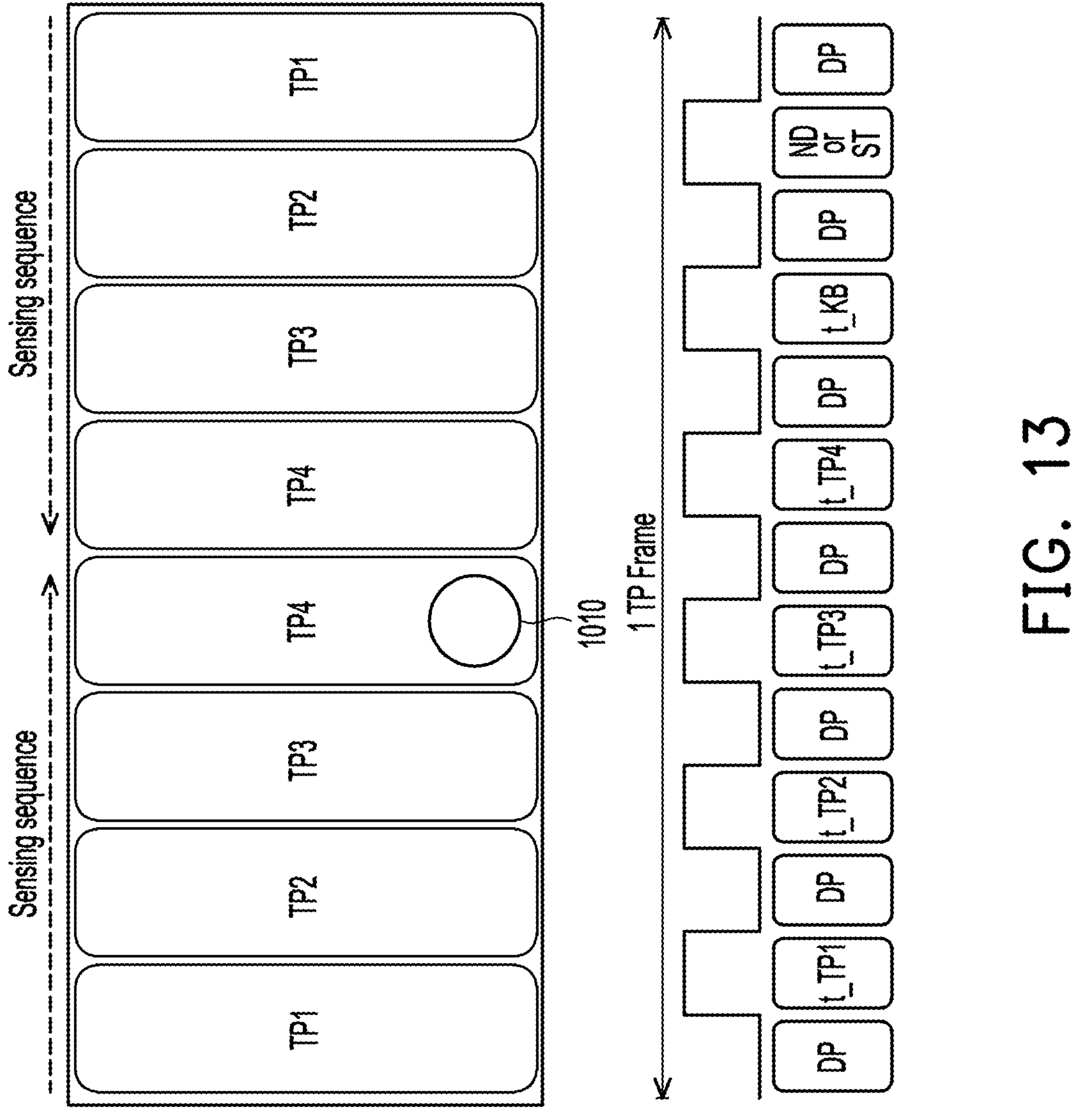
FIG. 13 is a diagram illustrating a timing sequence for driving the knob device 1010 according to another embodiment of the invention.

FIG. 13 is a diagram illustrating a timing sequence for driving the knob device 1010 according to another embodiment of the invention. Referring to FIG. 13, the knob device 1010 is disposed on the touch sensing block TP4. One TP frame further includes a period t_KB. The controller 130 can finish the knob function detection in the period t_KB. The timing sequence of FIG. 13 is not intended to limit the invention.

Figure 14:
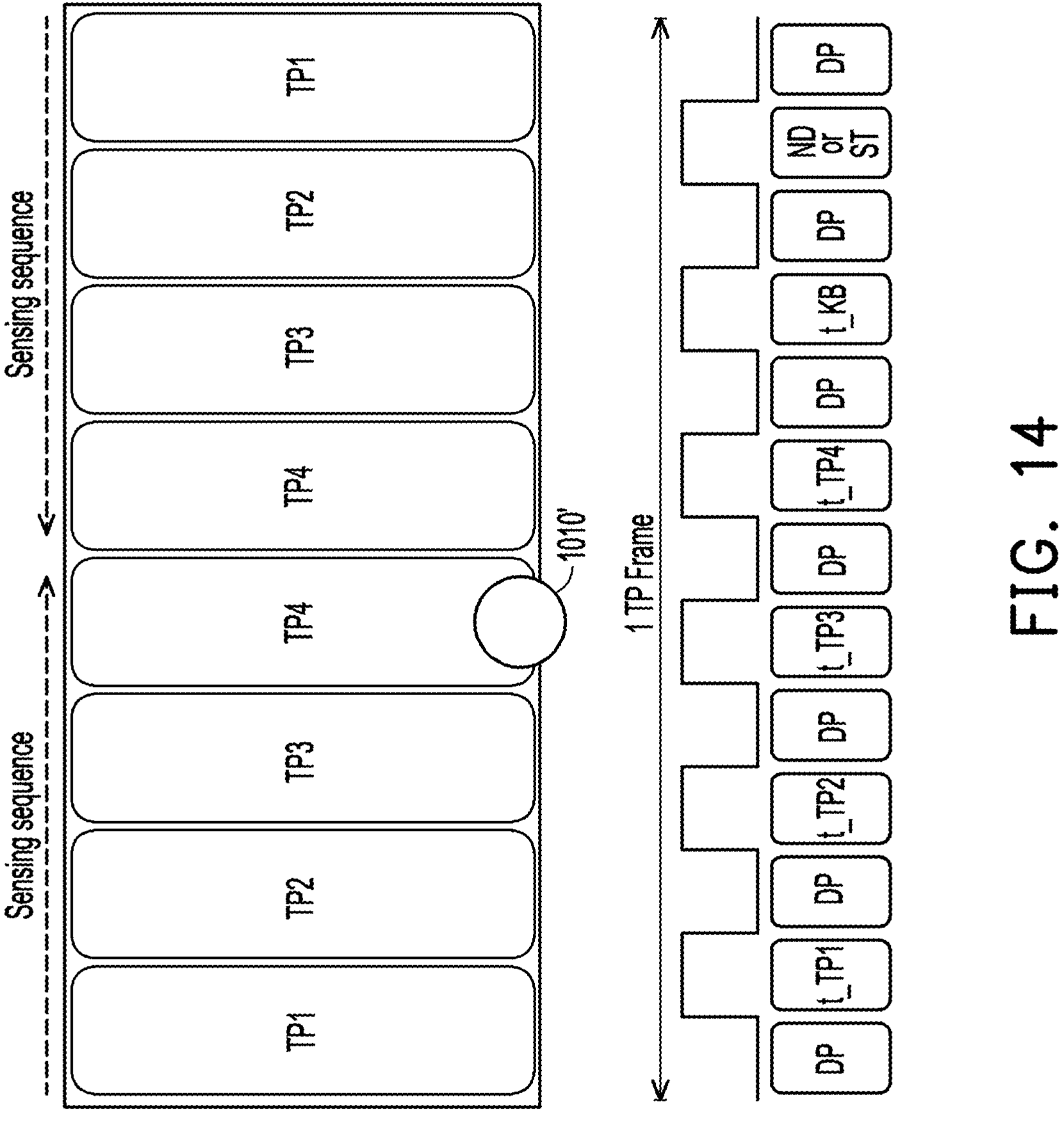
FIG. 14 is a diagram illustrating a timing sequence for driving the knob device 1010' according to another embodiment of the invention.

FIG. 14 is a diagram illustrating a timing sequence for driving the knob device 1010' according to another embodiment of the invention. Referring to FIG. 14, a part of the knob device 1010' is disposed on the active area, and a part of the knob device 1010' is disposed outside of the active area. The conductive pads of the bottom layer are designed to be arranged in the active area. The controller 130 can still finish the knob function detection in the period t_KB.

In summary, in the embodiment of the invention, a plurality of knob structures are provided. The knob device is attached to the touch panel. The controller detects the conductive pads of the bottom layer through the touch sensors to obtain different sensing results. Based on the difference in the sensing results of the conductive pads, the controller may learn the rotation direction and the press position of the knob cap on the base. The knob devices can detect rotation, press and press-rotation operations from users. All of the knob structures can solve the problem of related arts not being able to press down to rotate. Thus, the knob device realizes the physical knob function on the touch panel.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A knob device, comprising:

a first layer, disposed on a touch panel, and comprising a plurality of first conductive pads with interconnectors; and a second layer, disposed on the first layer, and comprising a first conductive part, wherein the first conductive part and the first conductive pads with the interconnectors are connectable to provide a plurality of press states in response to a press operation, wherein the plurality of first conductive pads comprises at least three first conductive pads, and the plurality of press states comprises any two of the at least three first conductive pads being conducted with the first conductive part.

2. The knob device according to claim 1, further comprising:

a third layer, disposed on the second layer, and comprising a conductive surface, wherein the conductive surface is connected to the first conductive part via at least one conductive pillar.

3. The knob device according to claim 2, wherein the third layer further comprises an insulating part, disposed between the conductive surface and the second layer.

4. The knob device according to claim 2, wherein the second layer further comprises:

a second conductive part, wherein the first conductive part, the second conductive part, and the first conductive pads with the interconnectors are connectable to provide the plurality of press states in response to the press operation.

5. The knob device according to claim 4, wherein the first conductive part, the second conductive part, and the first conductive pads with the interconnectors are connectable to provide a plurality of rotation states in response to a rotation operation under the press operation.

6. The knob device according to claim 4, wherein the second layer further comprises:

at least one switch device, configured to connect the first conductive part and the second conductive part in response to the press operation.

7. The knob device according to claim 4, wherein the conductive surface connects the first conductive part and the second conductive part via conductive pillars.

8. The knob device according to claim 1, further comprising:

a third layer, disposed on the second layer, and comprising an insulating part, wherein the insulating part is disposed on the second layer.

9. The knob device according to claim 8, wherein the second layer further comprises:

a second conductive part, wherein the first conductive part, the second conductive part, and the first conductive pads with the interconnectors are connectable to provide the plurality of press states in response to the press operation.

10. The knob device according to claim 9, wherein the second layer further comprises:

at least one switch device, configured to connect the first conductive part and the second conductive part in response to the press operation.

11. The knob device according to claim 9, wherein the first conductive part and the second conductive part are connected via a conductive line.

12. The knob device according to claim 8, wherein the first layer further comprises a second conductive pad, connected to the first conductive part via an interconnector.

13. The knob device according to claim 1, wherein the interconnectors of the first conductive pads have a same height.

14. The knob device according to claim 1, wherein the interconnectors of the first conductive pads have different heights.

15. The knob device according to claim 1, wherein the second layer further comprises a second conductive part, wherein the plurality of press states comprises the two of the at least three first conductive pads being conducted with the first conductive part and the second conductive part.

16. The knob device according to claim 1, wherein the first conductive part and the first conductive pads with the interconnectors are connectable to provide a plurality of rotation states in response to a rotation operation under the press operation.

* * * * *